(12) United States Patent  
Rawlinson et al.

(10) Patent No.: US 12,340,294 B2
(45) Date of Patent: Jun. 24, 2025

(54) DYNAMIC WELL CONSTRUCTION MODEL

(71) Applicant: Schlumberger Technology Corporation, Sugar Land, TX (US)

(72) Inventors: Sarah Louise Rawlinson, Stonehouse (GB); Avirup Bhattacharyya, Stonehouse (GB); George Emlyn Jones, Stonehouse (GB); Andrew Whitmore, Stonehouse (GB); Maja Ignova, Stonehouse (GB); Ian Farmer, Stonehouse (GB)

(73) Assignee: Schlumberger Technology Corp. / SHTC, Sugar Land, TX (US)

( * ) Notice: Subject to any disclaimer, the term of this patent is extended or adjusted under 35 U.S.C. 154(b) by 970 days.

(21) Appl. No.: 17/247,399

(22) Filed: Dec. 10, 2020

(65) Prior Publication Data

US 2021/0180439 A1   Jun. 17, 2021

Related U.S. Application Data

(60) Provisional application No. 62/947,025, filed on Dec. 12, 2019.

(51) Int. Cl.
*G06N 20/20* (2019.01)
*E21B 43/25* (2006.01)
(Continued)

(52) U.S. Cl.
CPC ............. *G06N 20/20* (2019.01); *E21B 43/25* (2013.01); *E21B 43/30* (2013.01); *E21B 47/04* (2013.01);
(Continued)

(58) Field of Classification Search
CPC .......... G06N 20/20; G06N 20/00; G06N 5/01; E21B 43/25; E21B 43/30; E21B 47/04; E21B 2200/20; E21B 2200/22; E21B 33/00; G01V 1/52; G06F 9/541; G06F 18/214; G06F 18/24; G06F 18/285
See application file for complete search history.

(56) References Cited

U.S. PATENT DOCUMENTS 9,934,338 B2    4/2018   Germain et al.
2003/0015351 A1 * 1/2003 Goldman ............... E21B 49/003
                                                              175/39

(Continued)

FOREIGN PATENT DOCUMENTS

WO    WO2007134242    * 11/2007   ............. G06F 17/00
WO    WO2018/067131   *  4/2018   ............. E21B 44/00
(Continued)

OTHER PUBLICATIONS

Breiman, L., "Consistency for a Simple Model of Random Forests", Technical Report 670, Statistics Department, University of California at Berkeley, 2004, 10 pages.

*Primary Examiner* — Emerson C Puente
*Assistant Examiner* — Alfred H B Wechselberger
(74) *Attorney, Agent, or Firm* — Jeffrey D. Frantz

(57) ABSTRACT

A method for dynamically constructing a well includes receiving inputs that specify characteristics of a proposed well. An indicator is generated for construction of the proposed well using the inputs and a machine learning model trained using data from actual wells, and the indicator is transmitted.

14 Claims, 18 Drawing Sheets

(51) Int. Cl.
    *E21B 43/30*     (2006.01)
    *E21B 47/04*     (2012.01)
    *G01V 1/52*     (2006.01)
    *G06F 9/54*     (2006.01)
    *G06F 18/214*     (2023.01)
    *G06N 20/00*     (2019.01)

(52) U.S. Cl.
    CPC ............... *G01V 1/52* (2013.01); *G06F 9/541* (2013.01); *G06F 18/214* (2023.01); *G06N 20/00* (2019.01); *E21B 2200/20* (2020.05)

(56) References Cited

U.S. PATENT DOCUMENTS

| | | | |
|---|---|---|---|
| 2017/0096881 A1* | 4/2017 | Dusterhoft | G06N 7/01 |
| 2018/0335538 A1* | 11/2018 | Dupont | G06F 17/18 |
| 2019/0345809 A1 | 11/2019 | Jain et al. | |
| 2020/0355839 A1 | 11/2020 | Jeong et al. | |
| 2020/0362686 A1 | 11/2020 | Puwanto et al. | |

FOREIGN PATENT DOCUMENTS

| | | | | |
|---|---|---|---|---|
| WO | WO2018/117890 | * | 6/2018 | ............. E21B 43/26 |
| WO | 2021119313 A1 | | 6/2021 | |

\* cited by examiner

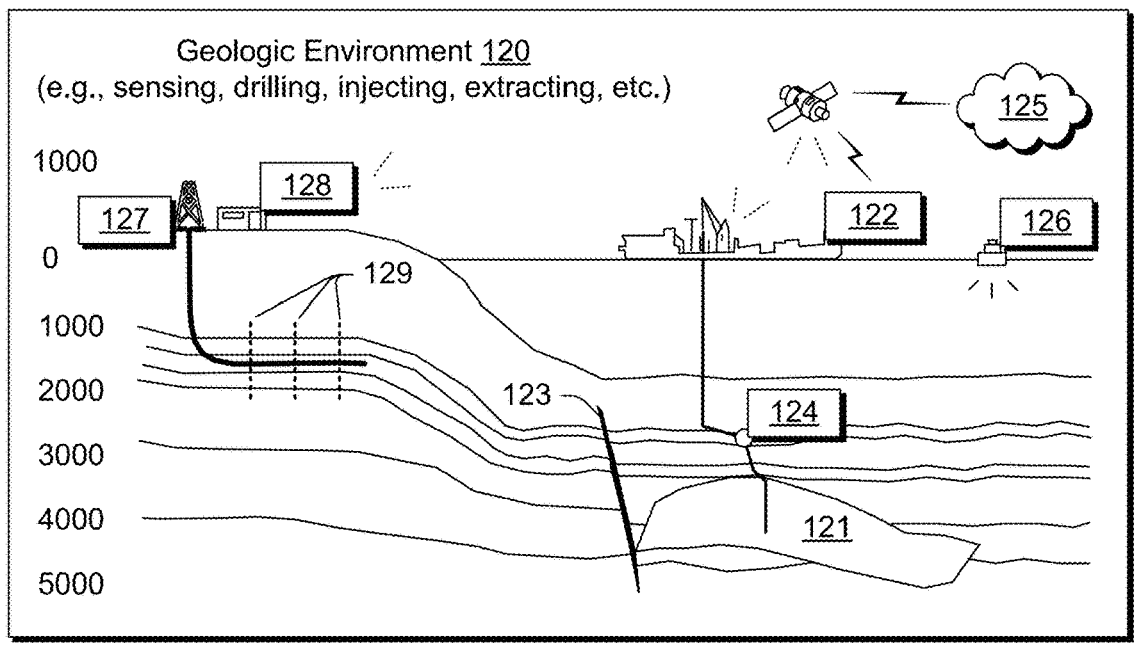
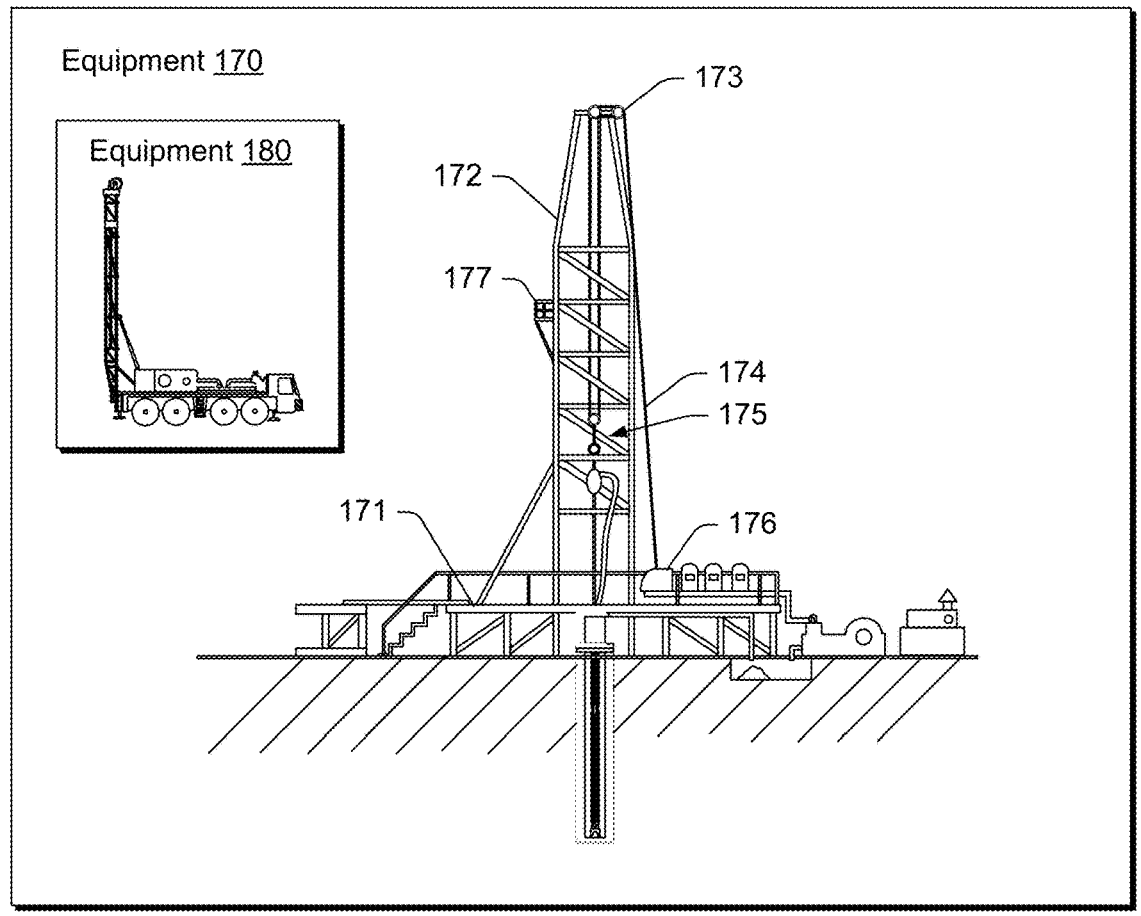
Fig. 1

Table 1400

| | input type | units | min | max | input response: model | suggested app input units | user input | input resolution |
|---|---|---|---|---|---|---|---|---|
| MudWeight | numerical | sg | 0.7 | 2.39 | 1.2 | ppg (pounds per gallon) | | 1dp |
| PlannedDrillingDistance | numerical | m | 100 | 6000 | 3250 | feet | | 250 ft |
| well_Latitude | numerical decimal | | 23 | 73 | 27.65 | decimal degrees | | 2dp |
| well_Longitude | numerical decimal | | -160 | -61 | -104.5 | decimal degrees | | 2dp |
| WellboreDiameter | numerical | m | 0.1 | 1.07 | 0.215 | decimal inches | 8.5 | 0.25 inches? |
| AvBHTemperature_deg | numerical | degC | 0 | 150 | 75 | degF | | 5degC |
| TopDepthTVD | numerical | m | 0 | 4200 | | | | 50ft |
| OBROP | numerical | m/s | 0 | 0.04 | 0.0084 | feet/hour | 100 | 10ft/hr |
| deg_MaxDLS | numerical | deg/30m | 0 | 18 | 3.2 | deg/100ft | 5 | 0.5deg |
| RunType | categorical | | | | Vertical | | | category |
| BitManufacturer | categorical | | | | Smith-SLB | | | category |
| BHAType_grouped | categorical | | | | | | | category |

Fig. 14

Variables Analysis 1500

| feature_name | feature_description | importance |
|---|---|---|
| PlannedDrillingDistance | PlannedDrillingDistance | 0.148809239 |
| OBROP | OBROP | 0.135058462 |
| TopDepthTVD | TopDepthTVD | 0.104138347 |
| deg_MaxDLS | deg_MaxDLS | 0.099128679 |
| well_Longitude | well_Longitude | 0.091187197 |
| well_Latitude | well_Latitude | 0.087930025 |
| AvBHTemperature_deg | AvBHTemperature_deg | 0.087251739 |
| MudWeight | MudWeight | 0.073127273 |
| WellboreDiameter | WellboreDiameter | 0.045329637 |
| dummy:BHAType_grouped:Vortex | BHAType_grouped is Vortex | 0.0179678 |
| dummy:RunType:Curve | RunType is Curve | 0.013138086 |
| dummy:BHAType_grouped:Steerable Motor | BHAType_grouped is Steerable Motor | 0.009810474 |
| dummy:BitManufacturer:Smith-SLB | BitManufacturer is Smith-SLB | 0.00966875 |
| dummy:RunType:Vertical | RunType is Vertical | 0.009379316 |
| dummy:RunType:Lateral | RunType is Lateral | 0.009289025 |
| dummy:BitManufacturer:Security DBS (HAL) | BitManufacturer is Security DBS (HAL) | 0.008145704 |
| dummy:BitManufacturer:Hughes Christensen (Baker) | BitManufacturer is Hughes Christensen (Baker) | 0.008020061 |
| dummy:BitManufacturer:Ulterra | BitManufacturer is Ulterra | 0.006782055 |
| dummy:BHAType_grouped:Rotary Steerable | BHAType_grouped is Rotary Steerable | 0.006382779 |
| dummy:BitManufacturer:Other | BitManufacturer is Other | 0.00556891 |
| dummy:BitManufacturer:ReedHycalog (NOV) | BitManufacturer is ReedHycalog (NOV) | 0.005137138 |
| dummy:BHAType_grouped:Straight Motor | BHAType_grouped is Straight Motor | 0.005073683 |
| dummy:RunType:Curve/Lateral | RunType is Curve/Lateral | 0.003694722 |
| dummy:RunType:Tangent | RunType is Tangent | 0.002617517 |
| dummy:BitManufacturer:Varel | BitManufacturer is Varel | 0.002481899 |
| dummy:RunType:Vertical/Curve | RunType is Vertical/Curve | 0.002378377 |
| dummy:RunType:N/A | RunType is N/A | 0.001157193 |
| dummy:RunType:Vertical/Curve/Lateral | RunType is Vertical/Curve/Lateral | 6.90E-04 |
| dummy:BitManufacturer:JZ | BitManufacturer is JZ | 2.07E-04 |
| dummy:BitManufacturer:DDS | BitManufacturer is DDS | 1.34E-04 |
| dummy:BitManufacturer:DPI | BitManufacturer is DPI | 9.83E-05 |
| dummy:BitManufacturer:United Diamond | BitManufacturer is United Diamond | 6.92E-05 |
| dummy:BitManufacturer:Encore | BitManufacturer is Encore | 5.61E-05 |
| dummy:BitManufacturer:BurService | BitManufacturer is BurService | 2.81E-05 |
| dummy:BitManufacturer:Sandvik | BitManufacturer is Sandvik | 1.80E-05 |
| dummy:BitManufacturer:Volgaburmash | BitManufacturer is Volgaburmash | 1.75E-05 |
| dummy:BitManufacturer:UDOL | BitManufacturer is UDOL | 1.27E-05 |
| dummy:BitManufacturer:BoFeng | BitManufacturer is BoFeng | 6.24E-06 |
| dummy:BitManufacturer:TSK | BitManufacturer is TSK | 5.42E-06 |
| dummy:BitManufacturer:BurinTekh | BitManufacturer is BurinTekh | 3.46E-06 |

Fig. 15

DYNAMIC WELL CONSTRUCTION MODEL

CROSS-REFERENCE TO RELATED APPLICATIONS

This application claims the benefit of, and priority to, U.S. Patent Application Ser. No. 62/947,025, filed Dec. 12, 2019, which application is expressly incorporated herein by this reference in its entirety.

BACKGROUND

Drilling equipment may be utilized to drill into rock of a geologic region, for example, to form a borehole and equipment may be utilized to form a completed well from the borehole.

SUMMARY

In some embodiments, a method includes receiving inputs that specify characteristics of a proposed well. An indicator is generated for construction of the proposed well using the inputs and a machine learning model trained using data from actual wells, and the indicator is transmitted.

An example system includes a processor and memory accessible to the processor. Processor-executable instructions are stored in the memory and are executable by the processor to instruct the system to receive inputs that specify characteristics of a proposed well, generate an indicator for construction of the proposed well using the inputs and a machine learning model trained using data from actual wells, and transmit the indicator.

One or more computer-readable storage media can include computer-executable instructions executable to instruct a computing system to receive inputs that specify characteristics of a proposed well, generate an indicator for construction of the proposed well using the inputs and a machine learning model trained using data from actual wells, and transmit the indicator.

In an example embodiment, received inputs include well parameters and the indicator includes a percentage chance of success of meeting the run objectives. Optionally, the indicator may also include an identification of one or more of the received well parameters that caused the chance of success to be reduced or sub-optimum.

Various other apparatuses, systems, methods, etc. are also disclosed. Accordingly, this summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and aspects of example implementations can be more readily understood by reference to the following description taken in conjunction with the accompanying drawings.

FIG. 1 illustrates examples of equipment in a geologic environment;

FIG. 14 illustrates an example of a table;

FIG. 15 illustrates an example of variable analysis;

DETAILED DESCRIPTION

Figure 2:
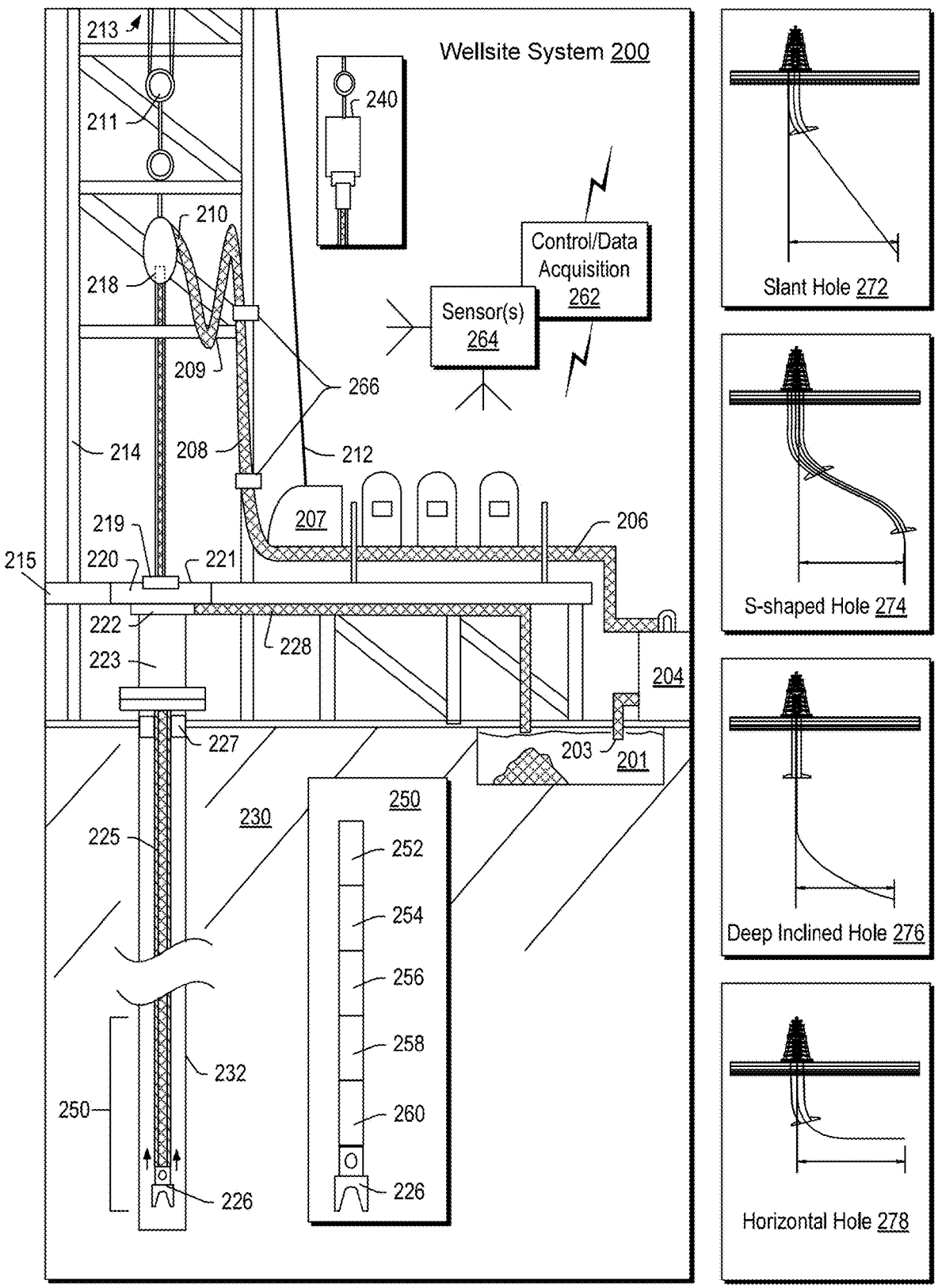
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or a borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. As an example, drilling can include using one or more logging tools that can perform one or more logging operations while drilling or otherwise with a drillstring (e.g., while stationary, while tripping in, tripping out, etc.). As an example, a wireline operation can include using one or more logging tools that can perform one or more logging operations. Wireline operations may utilize a cable that can include one or more electrical conductors that may provide for transmission of power, data, instructions, etc. A planning process may call for performing various operations, which may be performed in serial, parallel, serial and parallel, etc.

As an example, a well plan can be generated based at least in part on imposed constraints and known information. As an example, a well plan may be provided to a well owner, approved, and then implemented by a drilling service provider. In such an example, a rig may be used to drill according to a well plan. During a period of time during which a well plan is executed, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.), which may be considered to add to non-productive time (NPT). A drilling service may aim to keep NPT to a minimum subject to various constraints such as one or more of safety constraints, equipment constraints, well plan constraints, etc. Drilling has associated uncertainties that are managed in an on-going basis. Optimal drilling involves consideration of many factors, which can include static factors and dynamic factors that may be known a priori or come to light during drilling.

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a well site.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc., for fracturing, seismic sensing, analysis of seismic data, NMR logging, assessment of one or more fractures, injection, production, etc. As an example, the equipment 127 and/or 128 may provide for measurement, collection, communication, storage, analysis, etc. of data such as, for example, formation data, fluid data, production data (e.g., for one or more produced resources), etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (e.g., pulling out of hole, POOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore (e.g., POOH) and/or placing equipment in a bore (e.g., running in hole, RIH). As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 passes through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the vibrating hose 206, standpipe 208 and kelly hose 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping.

A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may be modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical (e.g., kickoff) such that the bore is aimed at the target and, eventually, reaches the target. A deviation from vertical may be specified according to one or more doglegs, which may be in terms of severity (e.g., dogleg severity, DLS). Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; noting that a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface. For example, directional drilling can involve using a rotary mode with surface rotation and can involve using a sliding mode where a mud motor rotates a bit without surface rotation. In a rotary mode, surface rotation and mud motor rotation may be utilized to rotate a bit.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

In the example of FIG. 2, the LWD module 254 of the drillstring assembly 250 may be housed in a suitable type of drill collar and can include one or a plurality of selected types of logging tools (e.g., NMR unit or units, etc.). In the example of FIG. 2, more than one LWD and/or MWD module can be employed, for example, as represented at by the MWD module 256 of the drillstring assembly 250.

The MWD module 256 may be housed in a suitable type of drill collar and can include one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller can generate power by flow of the mud; noting that other power and/or battery systems may be employed for purposes of powering one or more components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more NMR measuring devices (e.g., NMR units, etc.) may be included in a drillstring (e.g., a BHA, etc.) where, for example, measurements may support one or more of geosteering, geostopping, trajectory optimization, etc.

FIG. 2 also shows some examples of types of holes that may be drilled at least in part using directional drilling technology. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As mentioned, a trajectory and/or a drillstring may be characterized in part by a dogleg severity (DLS), which can be a two-dimensional parameter specified in degrees per 30 meters (e.g., or degrees per 100 feet).

As an example, a directional well can include several shapes where each of the shapes may aim to meet particular operational demands. As an example, a drilling process may be performed on the basis of information as and when it is relayed to a drilling engineer (e.g., a directional driller, DD). As an example, inclination and/or direction may be modified based on information received during a drilling process.

As an example, various types of downhole equipment may provide real time or near real time data of interest (e.g., inclination, direction, pressure, temperature, real weight on the drill bit, torque stress, etc.). For example, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
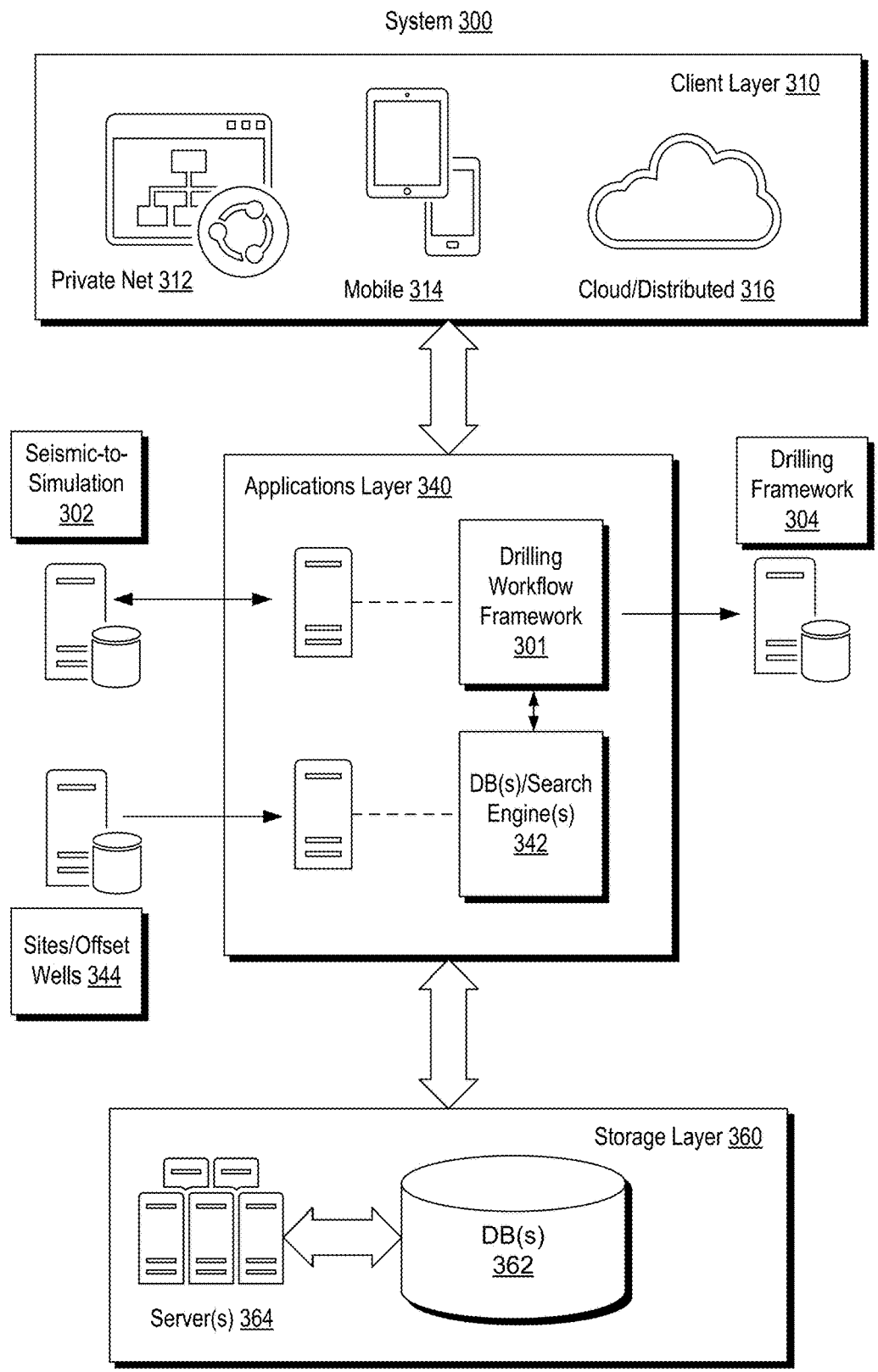
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360. In such an example, a computational framework may be provided for handling of logging measurements and/or data derived from logging measurements. For example, logging information may be provided to the seismic-to-simulation framework 302 and/or to the drilling framework 304. Such information may be utilized for model building (e.g., constructing a multidimensional model of a geologic environment), generating a trajectory for a well (e.g., or an extension thereof), generating a stimulation plan (e.g., fracturing, chemical treatment, etc.), controlling one or more drilling operations, etc.

In the example of FIG. 3, the client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engine features (e.g., sets of executable instructions to perform various actions, etc.).

As an example, the database management component 342 can include one or more search engine features that provide for searching one or more information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more components may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites 344, which may be or include one or more offset wellsites 344. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering. As an example, an operation may involve logging via one or more downhole tools.

In the example of FIG. 3, the storage layer 360 can include various types of data, information, etc., which may be stored in one or more databases 362. As an example, one or more servers 364 may provide for management, access, etc., to data, information, etc., stored in the one or more databases 362. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 340 is implemented to perform one or more workflows associated with a particular wellsite, data, information, etc., associated with that particular wellsite may be indexed based at least in part on the wellsite being an index parameter (e.g., a search parameter).

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework (e.g., a logging data framework, etc.) and the drilling framework 304 before, during and/or after performance of one or more drilling operations. In such an example, the one or more drilling operations may be performed in a geologic environment (see, e.g., the environment 120 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, Washington). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, California).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
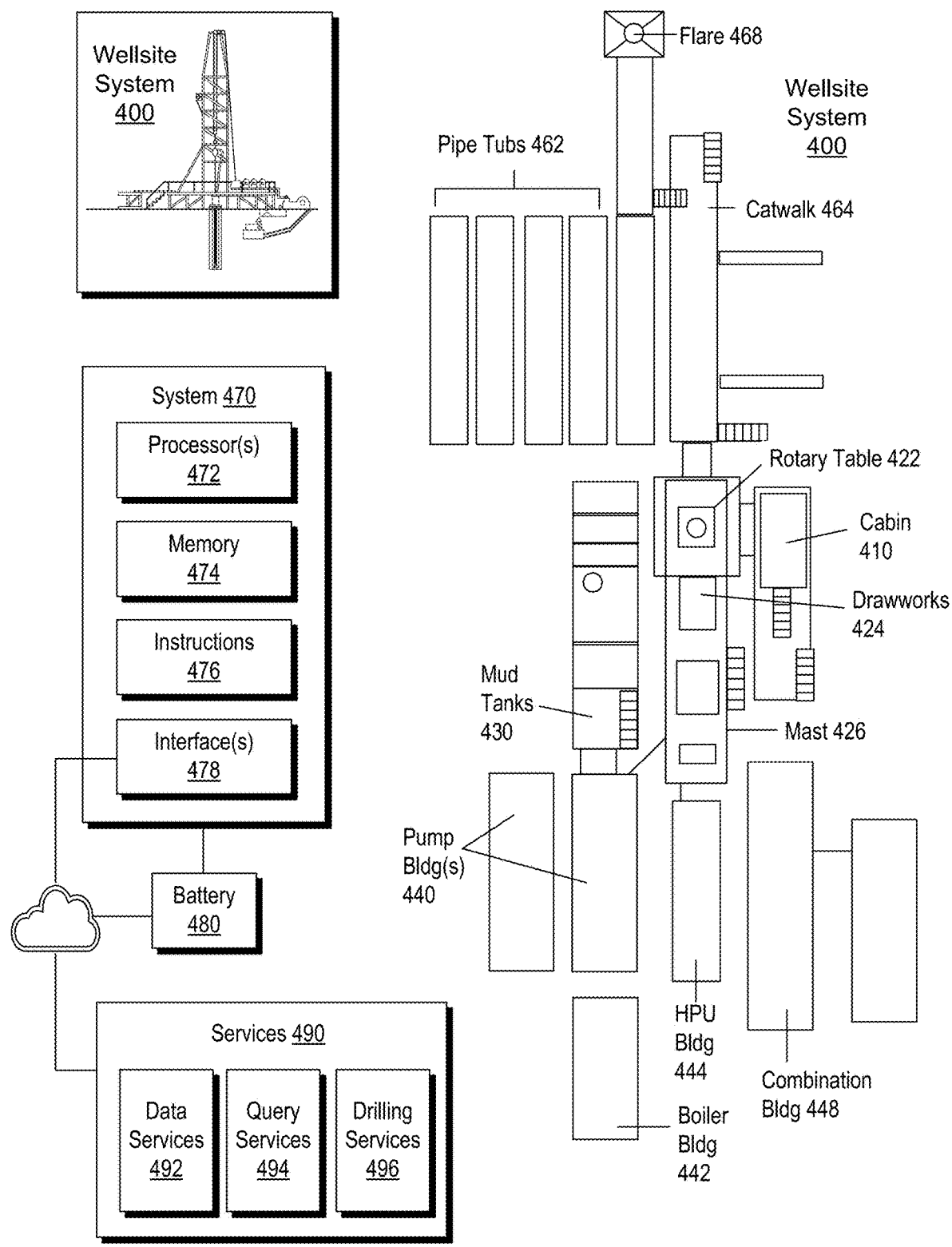
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, a hydraulic pumping units (HPU) building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

A wellsite can include a prime mover as a source of power. As an example, a prime mover can include one to four or more diesel engines, which may produce several thousand horsepower. Such engines can be operatively coupled to one or more electric generators. Electrical power may be distributed by a silicon-controlled-rectifier (SCR) system. Rigs that convert diesel power to electricity may be referred to as electric rigs or diesel electric rigs. As an example, a rig can be configured for transmission of power from one or more diesel engines to one or more rig components (e.g., drawworks, pumps, rotary table, etc.) through mechanical belts, chains, clutches, etc. Such a configuration may be referred to as a mechanical rig or a so-called "power rig".

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a system management bus (SMBus) or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace.

As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
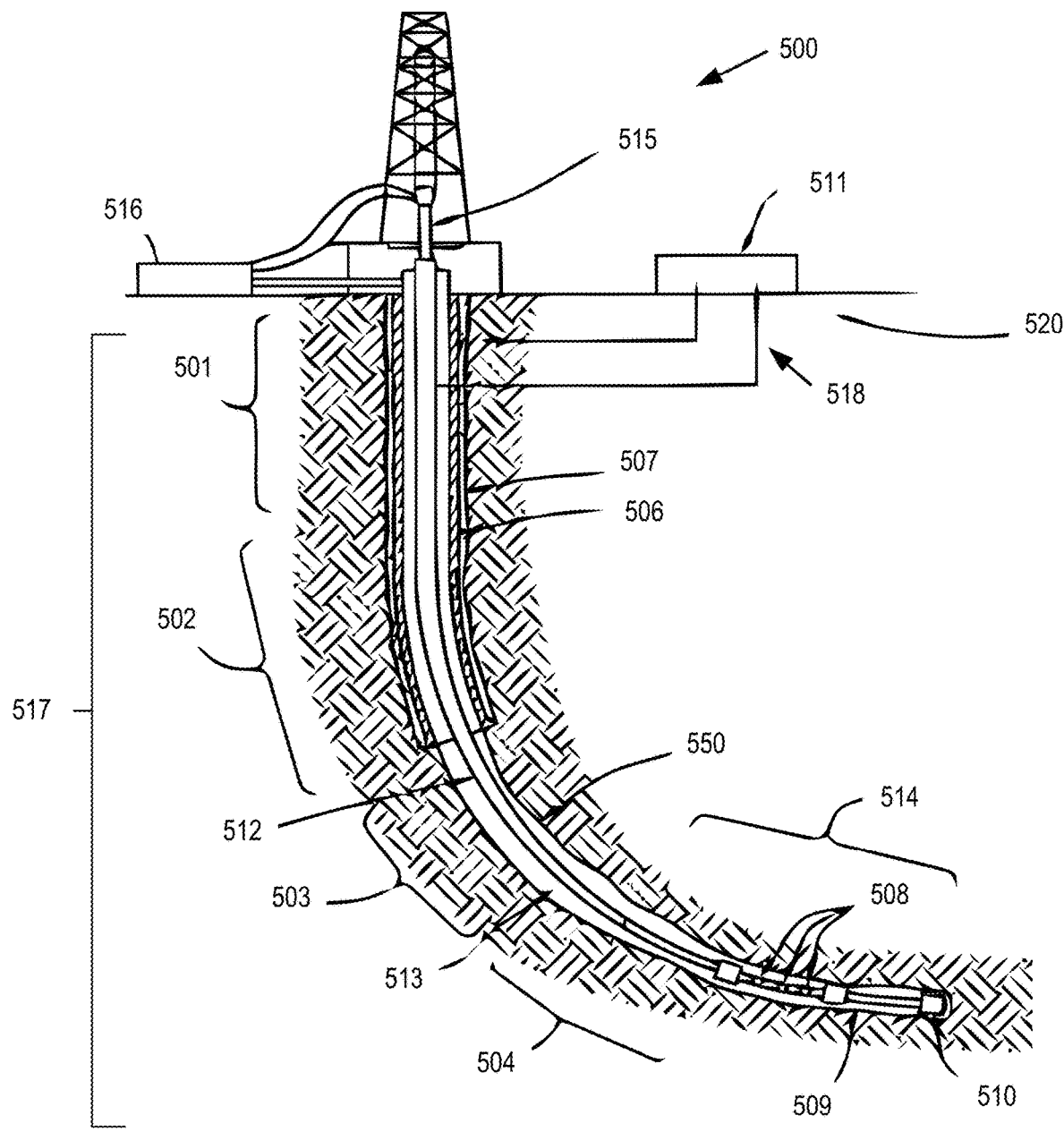
FIG. 5 illustrates an example of a system.

FIG. 5 shows a schematic diagram depicting an example of a drilling operation of a directional well in multiple sections. The drilling operation depicted in FIG. 5 includes a wellsite drilling system 500 and a field management tool 520 for managing various operations associated with drilling a bore hole 550 of a directional well 517. The wellsite drilling system 500 includes various components (e.g., drillstring 512, annulus 513, bottom hole assembly (BHA) 514, kelly 515, mud pit 516, etc.). As shown in the example of FIG. 5, a target reservoir may be located away from (as opposed to directly under) the surface location of the well 517. In such an example, special tools or techniques may be used to ensure that the path along the bore hole 550 reaches the particular location of the target reservoir.

As an example, the BHA 514 may include sensors 508, a rotary steerable system (RSS) 509, and a bit 510 to direct the drilling toward the target guided by a pre-determined survey program for measuring location details in the well. Furthermore, the subterranean formation through which the directional well 517 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 501, 502, 503 and 504), which may correspond to one or more of the multiple layers in the subterranean formation. For example, certain sections (e.g., sections 501 and 502) may use cement 507 reinforced casing 506 due to the particular formation compositions, geophysical characteristics, and geological conditions.

In the example of FIG. 5, a surface unit 511 may be operatively linked to the wellsite drilling system 500 and the field management tool 520 via communication links 518. The surface unit 511 may be configured with functionalities to control and monitor the drilling activities by sections in real time via the communication links 518. The field management tool 520 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 518 according to a drilling operation workflow. The communication links 518 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM™ toolkit framework (Schlumberger Limited, Houston, Texas).

As an example, a service can be or include one or more of OPTIDRILL™, OPTILOG™ and/or other services marketed by Schlumberger Limited, Houston, Texas The OPTIDRILL™ technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO' framework).

The OPTILOG™ technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO™ services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

Figure 6:
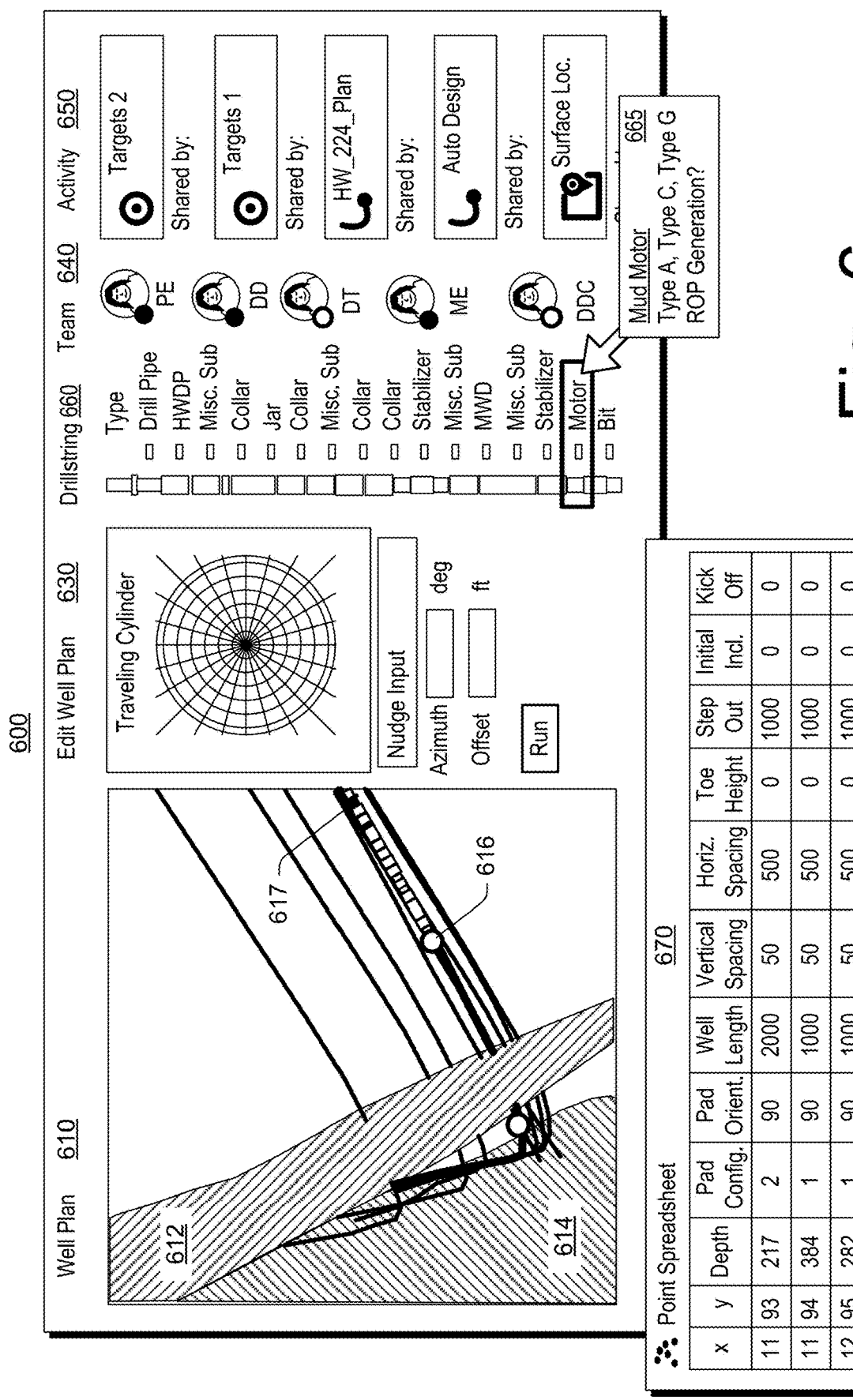
FIG. 6 illustrates an example of a system.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650.

As shown in the example of FIG. 6, the GUI 600 can include a drillstring graphical control 660 of a drillstring 617 where, for example, various portions of the drillstring graphical control 660 may be selected to expose one or more associated parameters (e.g., type of equipment, equipment specifications, operational history, etc.). In the example of FIG. 6, the drillstring graphical control 660 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

As an example, a workflow can include utilizing the drillstring graphical control 660 of a drillstring 617 to select and/or expose information associated with a component or components such as, for example, a bit and/or a mud motor. As an example, in response to selection of a bit and/or a mud motor (e.g., consider a bit and mud motor combination), a computational framework (e.g., via an ROP engine, etc.) can generate one or more rate of penetration (ROP) values, which may be utilized, for example, as set points for purposes of performing one or more drilling operations. In the example of FIG. 6, a graphical control 665 is shown that can be rendered responsive to interaction with the drillstring graphical control 660 of a drillstring 617, for example, to select a type of component and/or to generate one or more ROP values, etc. FIG. 6 also shows an example of a table 670 as a point spreadsheet that specifies information for a plurality of wells. As shown in the example table 670, coordinates such as "x" and "y" and "depth" can be specified for various features of the wells, which can include pad parameters, spacings, toe heights, step outs, initial inclinations, kick offs, etc.

As explained, construction of a well involves various processes utilizing various types of equipment that can be utilized to drill a wellbore, complete a wellbore, etc. As explained, a plan can specify how construction of a well is to proceed. A plan can be detailed and specify sections, equipment, fluids, and procedures (e.g., standard operating procedures (SOPs), specialized procedures, etc.). A plan can be specific to a particular well in a particular region of the world. Where multiple wells are to be constructed in a particular region, some similarities may exist, which may distinguish those wells from wells in one or more other regions of the world.

As an example of a region, consider the Permian Basin, which is an oil-and-gas-producing area located in West Texas and the adjoining area of southeastern New Mexico. Various producing formations such as the Yates, San Andres, Clear Fork, Spraberry, Wolfcamp, Yeso, Bone Spring, Avalon, Canyon, Morrow, Devonian, and Ellenberger are part of the Permian Basin, with oil and natural gas production depths ranging from approximately 100 meters to approximately 10 kilometers below the surface. Other areas within the greater Permian Basin include the Delaware Basin (e.g., Bone Spring and Wolfcamp or Wolfbone) and Midland Basin (e.g., Spraberry and Wolfcamp or Wolfberry). Various wells in the Permian Basin utilize one or more enhanced-recovery practices, which have had a substantial impact on US oil production.

As an example, consider four wells in the Upper Wolfcamp with approximately 2,000 meters of laterals, completed using approximately 28 stages, with initial production rates averaging approximately 880 barrels a day (bbl/d). Drilling of multiple horizontal wells may be performed using a single pad with each well targeting a different interval. Such wells may involve stimulation such as, for example, hydraulic fracturing. As an example, series of wells may be arranged side-by-side (e.g., approximately 200 meters apart) to provide a desired drainage area.

In the Permian Basin, laterals can be drilled to stay within a target zone. For example, drilling operations can involve real-time geosteering that utilizes data from measurement-while-drilling tools (e.g., gamma ray, etc.). Such geosteering may aim to stay within a range such as, for example, plus or minus 10 meters from a desired trajectory.

During drilling, a goal may be to achieve a targeted rate of penetration (ROP), which may be translated to a distance per day metric. Particular issues may arise during drilling that can limit ROP or otherwise limit distance per day.

Drilling can involve using one or more types of rigs, which can be specified in terms of power (e.g., horsepower), types of drives (e.g., rotary table, top drive, etc.), pressure capacity for mudflow (e.g., standpipe pressure), etc. As an example, a rig may be transportable and possibly movable via skid up to a certain distance. As an example, a rig can include single or multi-fuel engines (e.g., natural gas, diesel, gasoline, etc.).

As to time to drill, as mentioned, ROP can be a factor in determining distance drilled per day. As an example, consider a Permian Basin lateral of approximately 1.6 kilometers being drillable in approximately 20 days such that a distance per day is approximately 80 meters per day. As explained, various issues may arise that can reduce a distance per day metric. Such issues can give rise to non-productive time (NPT). As an example, consider a dogleg of a trajectory being too severe (DLS) such that a planned trajectory is revised, which may be longer, demand a change of equipment, etc. In directional drilling, various factors can exist that may not exist in vertical drilling. As an example, a region may include both directional and vertical wells. In such an example, planning and actual drilling may aim to assure that directional wells steer clear of vertical wells, which may be preexisting wells. Thus, various issues may arise due to history of a region.

Above, the Permian Basin is given as an example to provide for a description of some examples of technical issues associated with well construction, some of which may be associated with a particular region, a particular type of drilling, etc.

As explained, a detailed well plan can demand substantial resources and take a considerable amount of time to generate. As an example, a method can provide a rapid assessment for a proposed well, which may help to alleviate commencement of a detailed planning process that may ultimately determine that a proposed well is not practical according to various constraints.

As an example, a rapid assessment tool can be in the form of an application that can be executable at least in part using a mobile computing device such as a laptop computer, a tablet computer, a netbook, a smartphone, etc. Such a tool may allow for rapid assessment of a proposed well in a matter of minutes. In such an example, problematic proposed wells may be screened out or optionally tailored, if possible, to provide an indication of likely success. Where an indication of likely success is sufficiently high, as an example, a detailed planning process may be commenced with a lesser likelihood of failure.

As an example, an app can be executable on a mobile computing device for use by a member of a sales team to predict and highlight risk in drilling contracts and to maximize on performance-based revenue. An app can be processor-executable instructions stored in a tangible storage medium (e.g., a memory device, etc.) that can be installed, for example, by being downloaded via a network connection (e.g., Internet connection, etc.). An app can be part of a distributed system where, for example, execution of the app on a local device can involve establishing communication with a remote device (e.g., a server, etc.). Such communication may be in the form of an application programming interface (API).

As an example, consider an app that utilizes the COCOA TOUCH (Apple Inc., Cupertino, California) application development environment (ADE), which is suited for building software programs (e.g., apps) to run on the iOS operating systems (e.g., also consider iPadOS, watchOS, etc.). As an example, an app may utilize one or more types of programming frameworks (e.g., languages, etc.). For example, consider a C language, SWIFT language (Apple Inc.), etc.

The COCOA TOUCH ADE provides an abstraction layer of iOS and is based on the macOS COCOA API toolset, primarily written in the Objective-C language. The COCOA TOUCH ADE follows a Model-View-Controller (MVC) software architecture.

The MVC architecture can use model objects that encapsulate data specific to an application and define logic and computation that process the data. A model object can have to-one and to-many relationships with other model objects, and so sometimes the model layer of an application effectively is one or more object graphs. Much of the data that is part of the persistent state of the application (whether that persistent state is stored in files or databases) can reside in the model objects after the data is loaded into the application. Because model objects represent knowledge and expertise related to a specific problem domain, they can be reused in similar problem domains. A model object may have no explicit connection to view objects that present its data and allow users to edit that data such that the model object is not be concerned with user-interface and presentation issues.

As to communication, user actions in the view layer that create or modify data can be communicated through a controller object and result in the creation or updating of a model object. When a model object changes (for example, new data is received over a network connection), it notifies a controller object, which updates the appropriate view objects.

As to a view object, it can be an object in an application that a user can see (e.g., for rendering information to one or more interfaces, etc.). For example, a view object can provide for rendering and responding to user actions. View objects can display data from an application's model objects and enable the editing of that data; noting that view objects tend to be decoupled from model objects in an MVC application.

As to communication, a view object can learn about changes in model data through an application's controller objects and communicate user-initiated changes (e.g., text entered in a text field, etc.) through controller objects to an application's model objects.

A controller object can act as an intermediary between one or more of an application's view objects and one or more of its model objects. Controller objects can be a conduit through which view objects learn about changes in model objects and vice versa. Controller objects can also perform setup and coordinating tasks for an application and manage the life cycles of other objects.

As to communication, a controller object can interpret user actions made in view objects and communicate new or changed data to the model layer. When model objects change, a controller object can communicate that new model data to the view objects so that they can display it.

While various technologies of Apple Inc. are mentioned, one or more other technologies may be utilized. For example, consider the ANDROID OS, which is based on a modified version of the LINUX kernel and other open source software, designed primarily for touchscreen mobile devices such as smartphones and tablets.

As an example, an app can use data from previous drilled wells and machine learning to provide a data-based estimate on parameters of a planned well to a user.

As an example, a machine learning model (ML model) can harness data from previous wells (e.g., via one or more databases for training, etc.) and feed data about an intended well to be drilled into a trained ML model. In such an example, a user can input various basic planned well parameters and then analyze the input using the ML model as operatively coupled to the app to obtain a percentage chance of success of meeting the desired objectives. Data from the previous wells used to train the ML model can include the same data as the inputs, additional data, and can also include "run objective met" or a similar data point indicating whether a client's objective (e.g., desired objective) has been met. In the data set for training the model, run objective met or desired objective met could be related to one or more of the inputs (e.g., TVD or ROP), time to completion of the well, a cost metric, or could be a combination of criteria. In the data set for training the model, run objective met could be represented as a binary "yes" or "no" indicating that the objective was or wasn't met, or it could be represented as a percentage indicating what percentage of the objective was met.

As an example, a ML model and app system can build on output, for example, by rendering one or more indications of what in their planned parameters has caused a chance of success to be sub-optimal. In such an example, a user may provide feedback, for example, by adjusting one or more inputs, which, in turn, can provide additional output that can allow for an assessment of whether or not a chance of success may be sufficiently increased.

As an example, a ML model-based approach can provide an option of using one or more types of models, which may be tailored (e.g., trained, etc.) using particular data. For example, consider a worldwide offset well data-based trained model, one or more location specific offset well data-based trained models, etc.

As an example, an app may be utilized where drilling is proposed in an environment where conditions give rise to various unknowns, which may act to increase risk in a viable well, increase risk of on the job issues, etc.

As an example, a system, which may be or include a computational framework, can include a machine learning algorithm that can access existing offset well data and estimate success of a well/run with planned parameters where the ML algorithm can be used to highlight risk in a proposed job. As an example, an application may be utilized by a technical sales team where it allows them to make more informed real-time decisions when bidding for and discussing work with potential clients.

As an example, an approach can consider wells with similar properties, which may be considered offset or not. For example, consider using a clustering technique to determine at a set of wells with similar properties to a well to be planned.

As to inputs, consider the following examples: actual bottom measured depth (ActBottomDepthMD); planned run total depth (PlannedRunTD); planned drilling distance (PlannedDrillingDistance); on bottom for ROP (OBROP); failure at measured depth (FailureMD); well longitude (well_Longitude); maximum dogleg severity (MaxDLS); well latitude (well_Latitude); actual top measured depth (ActTopDepthMD); top inclination (TopInclination); minimum DLS (MinDLS); average surface RPM (AvgSRPM); maximum bottom hole temperature (MaxBHTemperature); mud weight (MudWeight); on bottom ROP from activity (OBROPFromActivity); last casing depth (LastCasingDepth); maximum DLS depth (MaxDLSDepth); top depth as true vertical depth (TopDepthTVD); wellbore diameter (WellboreDiameter); well NPT cost (well_NPTCost); well top measured depth (well_TopDepthMD); top measured depth (TopDepthMD); ROP from activity (ROPFromActivity); bit jet size (BitJetSize); top azimuth (TopAzimuth); last casing diameter (LastCasingDiameter); section run number (SectionRunNumber); and RSS size (RSSSize).

As an example, consider the following input with example values: "TopDepthTVD": 754.6848; "WellboreDiameter": 0.31115; "PlannedDrillingDistance": 3525.0120000000006; "RunType": "Curve/Lateral"; "OBROP": 0.012055686666666668; "deg_MaxDLS": 6.617485772702712; "BitManufacturer": "Smith-SLB"; "BHAType_grouped": "Rotary Steerable"; "MudWeight": 1.126402; "AvBHTemperature_deg": 41.51548360000004; "well_Latitude": 70.5578308105469; and "well_Longitude": −149.903839111328.

The foregoing group of inputs includes eleven inputs where latitude and longitude may be considered to be a single input. As an example, latitude, longitude and TVD may be utilized as a proxy for a particular formation. For example, latitude and longitude can provide a surface location where TVD provides a depth that can be utilized to determine what formation exists at that depth. As an example, a location input or location inputs may be utilized in selecting an appropriate model. For example, as mentioned, a model may be trained or otherwise generated using data for wells in a region (e.g., Permian Basin, portion of Permian Basin, etc.). Upon input of location, an app may render a corresponding set of inputs that are particular to that region. For example, where wells in that region are predominantly horizontal (e.g., include one or more laterals), the app may render inputs that include one or more inputs for directional drilling (e.g., DLS, etc.). As an example, where a direction drilling input indicates that a proposed well may not be a directional well, the app can issue a notification that may indicate utilization of a particular model for that region that may be different than a directional drilling (e.g., horizontal well) model. In turn, a set of inputs may be updated according to whether a well is to be a vertical or a horizontal well.

Below is an example of output, shown in a coded format, from an app executed using the foregoing example input:

```
"result": {
  "prediction": "true",
  "probaPercentile": 80,
  "probas": {
    "true": 0.8004872447197048,
    "false": 0.19951275528029522
  }
}
```

As indicated in the output, the percentile of true is approximately 80 (e.g., 0.8005) while the percentile of false is approximately 20 (e.g., 0.1995) indicating that given client objectives may be met approximately 80% of the time given the inputs and the model. In other words, the model predicts the likelihood of success of run objective met or client objective met (e.g., RunObjectiveMet), where true indicates that the objective is met and false indicates that the objective is not met. As mentioned, an app can allow for feedback, which may optionally be guided by one or more indicia that can be rendered to a display, etc. For example, where a user would like to see if the percentile can be increased, the user may adjust one or more of the inputs. For example, consider entering a new value for the top true vertical depth (TopDepthTVD) that is 1500 rather than 754.6848. In such an example, the app can generate new or updated output such as, for example:

```
"result": {
  "prediction": "true",
  "probaPercentile": 73,
  "probas": {
    "true": 0.7449680530791902,
    "false": 0.25503194692080977
  }
}
```

As shown, the true value decreased while the false value increased. Thus, the change in the top depth true vertical depth input value did not increase chance of success of meeting the desired objectives. In such an example, an app may render a graphical user interface that includes one or more highlighted fields for one or more inputs that may be reasonably revised as to corresponding value or values, which may provide for an increase in chance of success.

As another example, consider the following input with example values: "TopDepthTVD": 5000; "WellboreDiameter": 0.31115; "PlannedDrillingDistance": 3525.0120000000006; "RunType": "Curve/Lateral"; "OBROP": 0.012055686666666668; "deg_MaxDLS": 6.617485772702712; "BitManufacturer": "ReedHycalog (NOV)"; "BHAType_grouped": "Rotary Steerable"; "MudWeight": 1.126402; "AvBHTemperature_deg":

41.51548360000004; "well_Latitude": 70.5578308105469; "well_Longitude": 149.903839111328, Below is an example of output, shown in a coded format, from an app executed using the foregoing example input:

```
"result": {
  "prediction": "true",
  "probaPercentile": 67,
  "probas": {
    "true": 0.695382131072821,
    "false": 0.304617868927179
  },
}
```

As an example, a change to input can be received, for example, in an effort to generate a higher probability percentile. For example, consider a change in the input as to Max DLS and bit manufacturer: "deg_MaxDLS": 4; and "BitManufacturer": "SMITH".

In such an example, a response can be:

```
{
  "result": {
    "prediction": "true",
    "probaPercentile": 70,
    "probas": {
      "true": 0.715382131072821,
      "false": 0.284617868927179
    },
    "ignored": false
  },
}
```

As a further example, consider changing inputs again to (e.g., as to steerable motor): "BHAType_grouped": "STEERABLE MOTOR". In such an example, results can be:

```
{
  "result": {
    "prediction": "true",
    "probaPercentile": 66,
    "probas": {
      "true": 0.6824948619010247,
      "false": 0.3175051380989752
    },
  }
}
```

Figure 7:
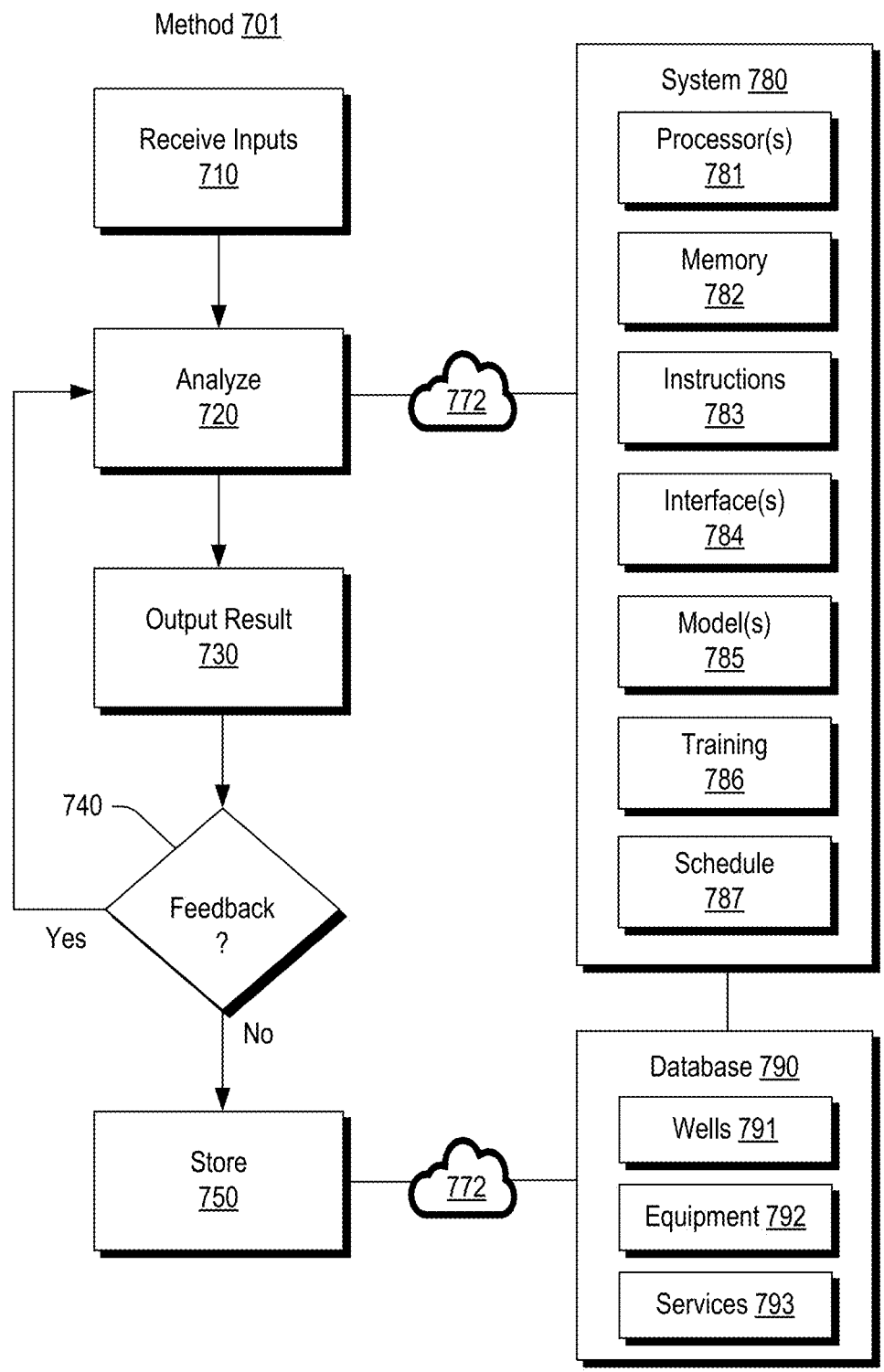
FIG. 7 illustrates an example of a method, an example of a system and an example of a database.

FIG. 7 shows an example of a method 701, an example of a system 780 and an example of a database 790. As shown, the method 701 can utilize the system 780, which can be operatively coupled to the database 790 (e.g., directly and/or indirectly).

As shown, the system 780 can include one or more processors 781, memory 782, instructions 783, one or more interfaces 784, one or more models 785, a training component 786 and a schedule component 787. As shown, the database 790 can include data organized for wells 791, equipment 792 and/or services 793. Such data may be organized or organizable by region (e.g., basin) and/or one or more other criteria (e.g., type of well, equipment, service, etc.).

As mentioned, a model can be a trained ML model. For example, the one or more models 785 can include one or more ML models trained using the training component 786 where training occurs utilizing data access from the database 790. For example, consider a Permian Basin ML model for horizontal wells that is trained using data from horizontal wells drilled in the Permian Basin. As mentioned, various issues may occur during construction of a well where knowledge gained therefrom may lead to improvements in construction of a subsequent well or wells. As an example, training can include weighting of data using one or more criteria, which may include date of construction, where more recently constructed wells may be more relevant (more highly weighted). In such an example, older vertical wells may be effectively filtered such that they do not impact training in a manner by which more recent horizontal wells impact training. As an example, training can include selecting data for a particular type of well (e.g., horizontal or vertical). As an example, a training set may be selected where the training set includes data for at least a threshold number of wells. For example, consider a threshold number of 100 wells. In such an example, where data is available for a lesser number, one or more types of criteria may be relaxed (e.g., to include vertical in addition to horizontal, to enlarge a region, etc.). As to an approach that enlarges a region to increase amount of training data, consider use of proximity to a particular region, type of formation, etc. As an example, an increase in a region may increase a region in a manner that is not contiguous. For example, a region can be enlarged by inclusion of data for wells that may be in a region within the same basin yet not contiguous (e.g., adjacent) to a region in which a proposed well is to be drilled.

As to the schedule component 787, it may receive information from one or more scheduled and/or ongoing well construction operations in one or more regions. For example, consider a group of wells to be drilled from a common pad In such an example, the schedule component 787 can inform the system 780 as to when additional exemplars may be available, which may, for example, be utilized to increase training data (e.g., and/or test data). As an example, where an app is utilized to assess a proposed well as to chance of success of desired objectives, where a decision is made to proceed to construct that proposed well, the schedule component 787 may be informed to log the proposed well as a scheduled item. As an example, data acquired during construction of that proposed well may become available via the database 790 or otherwise for model training, model testing, etc., for example, via the training component. In such an approach, the system 780 may be "evergreen" using data from proposed wells that actually get constructed.

In the example of FIG. 7, the method 701 includes a reception block 710 for receiving inputs, an analysis block 720 for analyzing the inputs, an output block 730 for outputting a result, a feedback block 740 for receiving feedback, and a storage block 750 for storing inputs, output, etc.

As shown in the example of FIG. 7, the analysis block 720 can include accessing the system 780 for generating a result based at least in part on the received inputs of the reception block 710. In such an example, the system 780 generate a result and transmit that result to the analysis block 720 such that the output block 730 can output the result. As shown, a loop can exist between the feedback block 740 and the analysis block 720, which can involve iterative accessing of the system 780 to generate results (e.g., a result at each iteration). As an example, where feedback is not received, the method 701 can proceed to the storage block 750, which may store inputs, a result, etc. For example, a session may be stored with a session identifier, which may be associated with a user, a sales team, a client, a region, a well, etc.

As an example, the storage block 750 can transmit information to the database 790, which may associate the information with one or more categories such as the wells 791, the equipment 792 and the services 793. Such an approach may also initiate generation of a data structure for storage of data during one or more phases of construction of a well. In such an example, the data structure may be utilized for storage of data acquired via one or more sensors, which may be utilized, for example, in training one or more of the models 785 using the training component 786. As an example, the storage block 750 and/or the database 790 may generate information that can be utilized by the system 780 by the schedule component 787. For example, the system 780 can schedule when a proposed well is to be constructed, etc., which may result in one or more calls to the database 790 for data that may be utilized for training by the training component to train, re-train, etc., one or more of the models 785.

Figure 8:
FIG. 8 illustrates an example of a method and examples of graphical user interfaces.

FIG. 8 shows an example of a method 800 that can utilize one or more graphical user interfaces 810, 820, 830, 840, and 850, which may be rendered to a display of a computing device (e.g., a mobile device), for example, via execution of an app that can be operatively coupled to one or more remote resources (e.g., cloud resources, a remote server, etc.). As mentioned, graphics may be rendered using a framework such as, for example, a MVC framework (e.g., view objects, etc.).

As shown, the method 800 can include rendering the GUI 810 with graphical controls where upon actuation of a graphical control for "Calculate Success", the method 800 can transition to the GUI 820, which includes various graphical controls for input pertaining to tool data (e.g., BHA type, bit type, RSS type, motor rubber, etc.). As shown, the GUI 820 can include a graphical control that can be for another type of data such as well data. In FIG. 8, the GUI 830 pertains to well data, which can be rendered as part of the method 800. As shown, the GUI 830 includes various graphical controls as to section type, section run number, planned drilling distance, well type, well latitude (e.g., and longitude), and well diameter. As shown, the GUI 830 can include a graphical control that can be for another type of data such as drilling data. In FIG. 8, the GUI 840 pertains to drilling data, which can be rendered as part of the method 800. As shown, the GUI 840 includes various graphical controls as to planned run TD, actual top depth MD, actual bottom depth MD, well top depth MD, top depth MD, top depth TVD, max DLS depth, and last casing depth. As shown, the GUI 840 can include a graphical control that can be for estimating a chance of success (e.g., a desired result or client objective). In such an example, in response to a swipe (e.g., a gesture), a tap, a voice command, etc., the method 800 can transmit information to a system (e.g., a framework) to generate a result as to a chance of success. In response, the method 800 can include rendering the GUI 850 as a result GUI that provides for outputting a chance of success as estimate (e.g., generating using a framework, etc.). As shown, a graphic can be rendered that indicates that a proposed well as a project has an 80 percent chance of success of meeting a desired objective. The GUI 850 can include one or more graphical controls, for example, to save information, to email a result (e.g., and/or other information), to start over, etc. As to start over, an option can exist to preserve previously entered information or an option can exist to revert to defaults, which may be null entries. As an example, a graphical control can be available for units, for example, consider feet, meters, etc.

Figure 9:
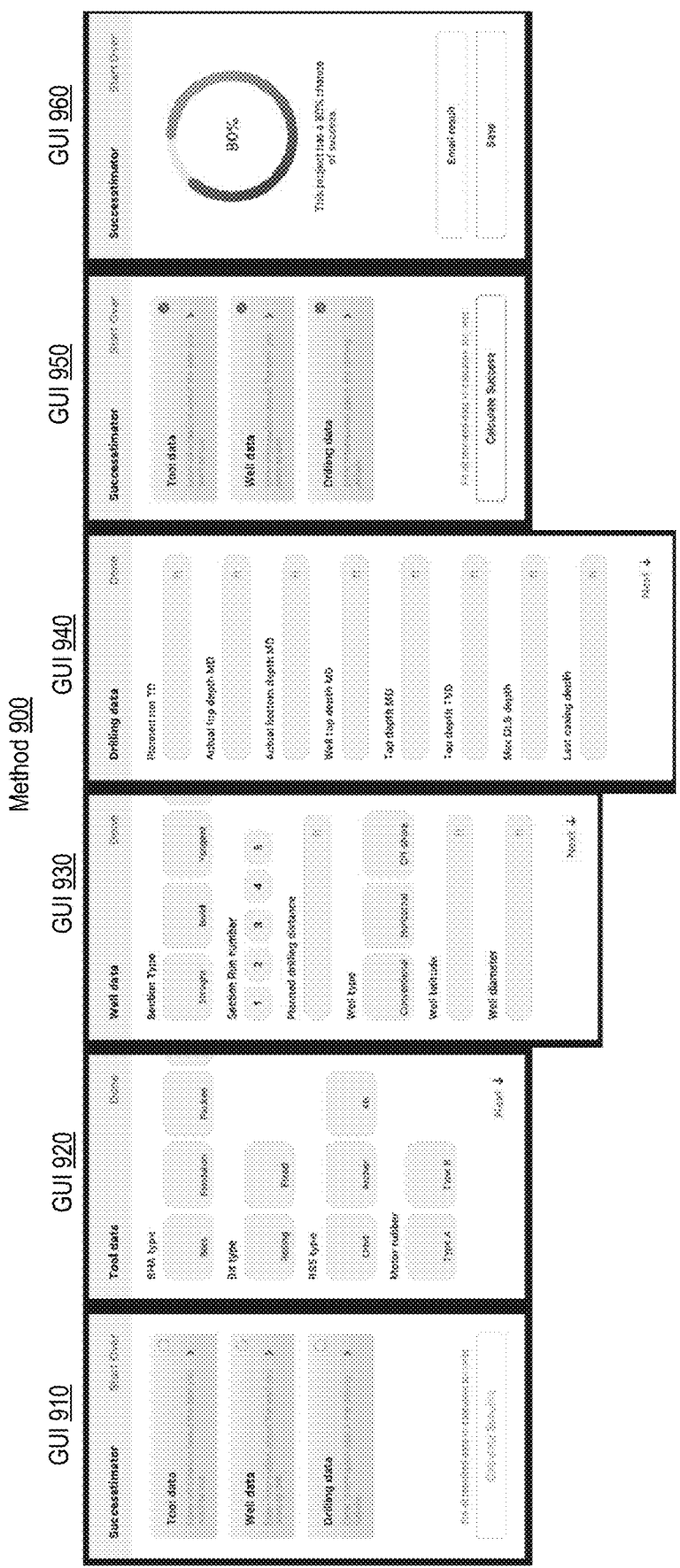
FIG. 9 illustrates an example of a method and examples of graphical user interfaces.

FIG. 9 shows an example of a method 900 along with some examples of GUIs 910, 920, 930, 940, 950 and 960. In FIG. 9, the GUIs 910 and 950 include graphical controls for selection of one or more of tool data, well data and drilling data. Such an approach can be tailored to utilize one or more of various types of data.

Figure 10:
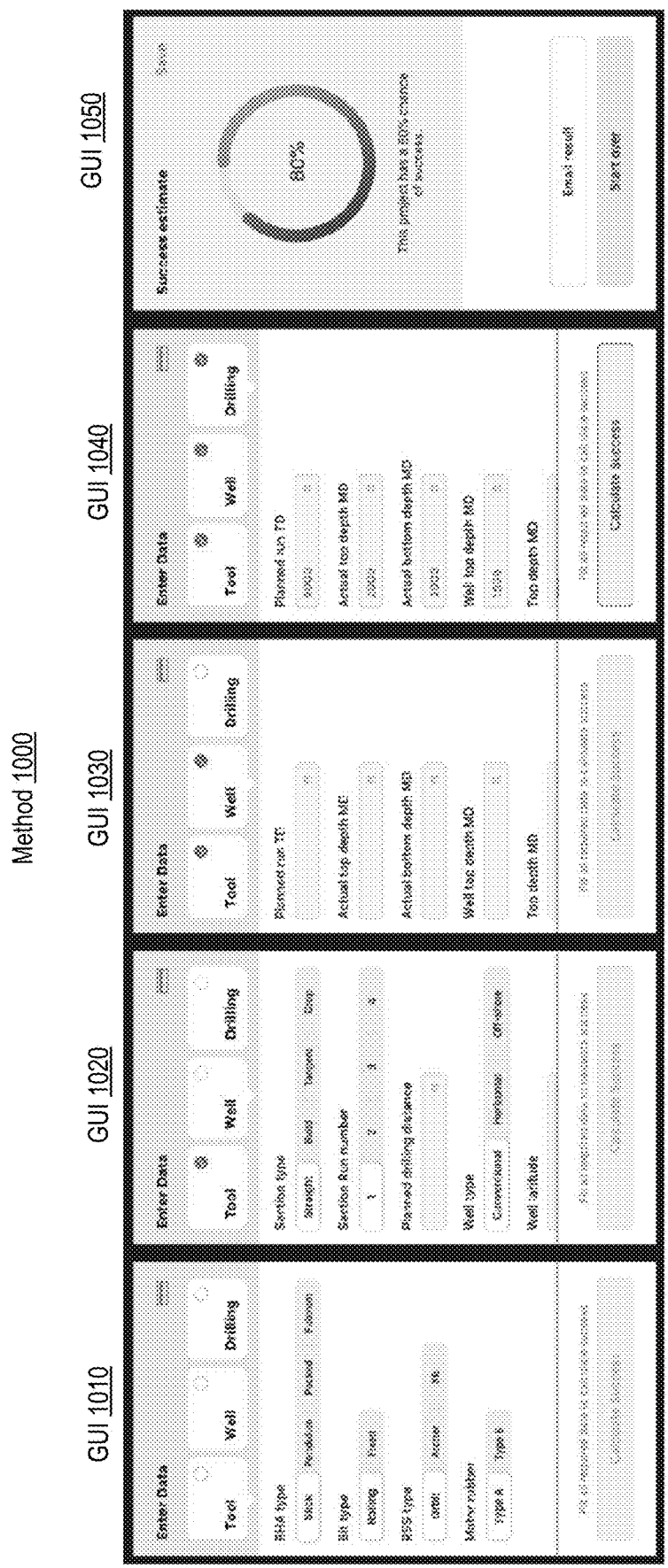
FIG. 10 illustrates an example of a method and examples of graphical user interfaces.

FIG. 10 shows an example of a method 1000 along with some examples of GUIs 1010, 1020, 1030, 1040 and 1050. In the example GUIs 1010, 1020, 1030 and 1040, various graphics indicate types of data as having been entered or not having been entered.

Figure 11:
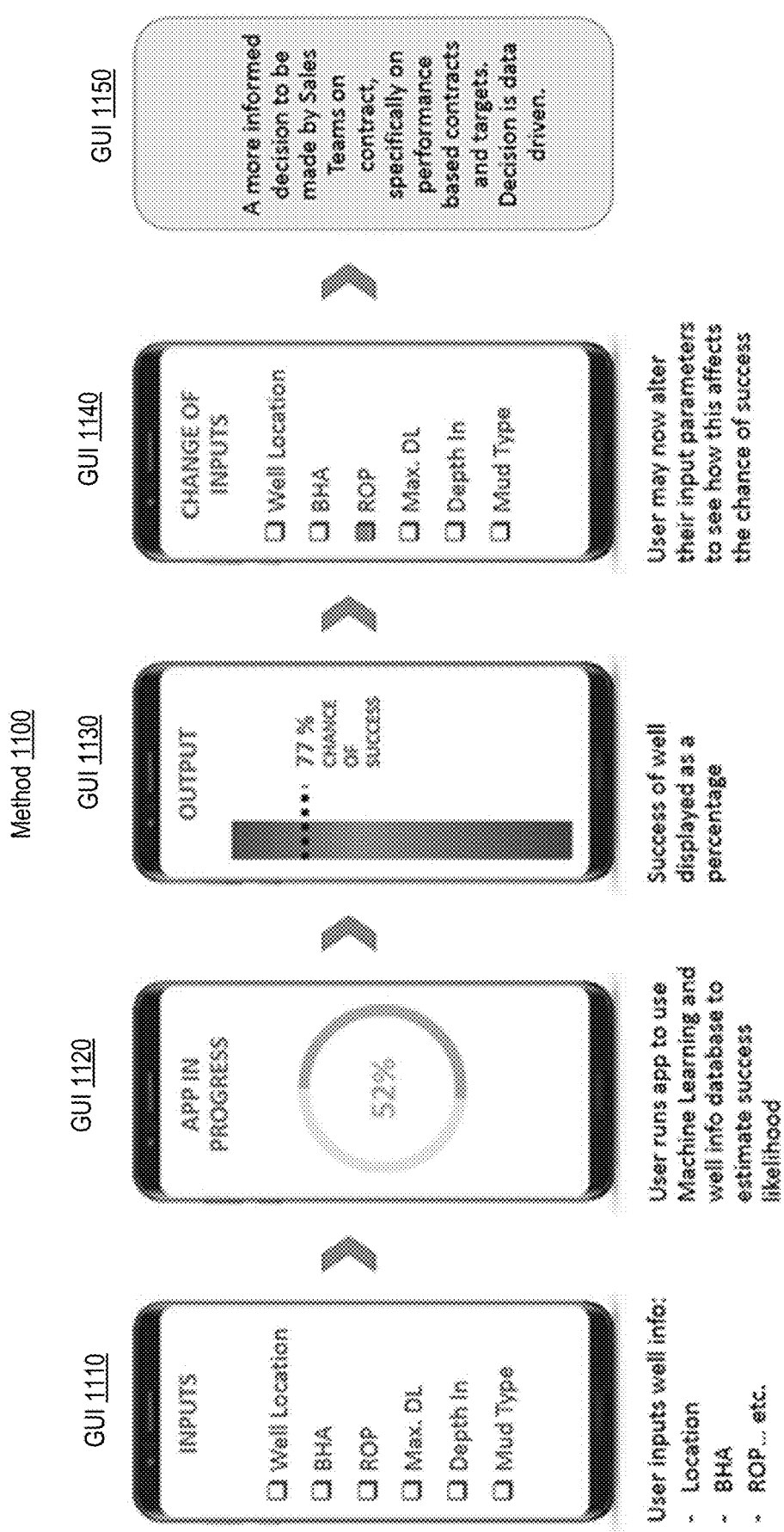
FIG. 11 illustrates an example of a method and examples of graphical user interfaces.

FIG. 11 shows an example of a method 1100 along with some examples of GUIs 1110, 1120, 1130, 1140 and 1150. The method 1100 includes the GUI 1140 as a loop GUI that can cause the method 1100 to reassess the chance of success of meeting a desired objective (see, e.g., the feedback block 740 of FIG. 7). As shown, a user can enter inputs using the GUI 1110 where the method 1100 uses the inputs to calculate a chance of success per the GUI 1120 where a result can be output per the GUI 1130. As to the GUI 1150, it can be an informative GUI, for example, as to next steps, conditions, etc.

As to a machine learning model (ML model), one or more types of models may be utilized. As an example, a model that classifies may be utilized. As an example, a model that provides percentiles as to two or more conditions may be utilized (e.g., true-false, true-neutral-false, etc.).

Figure 12:
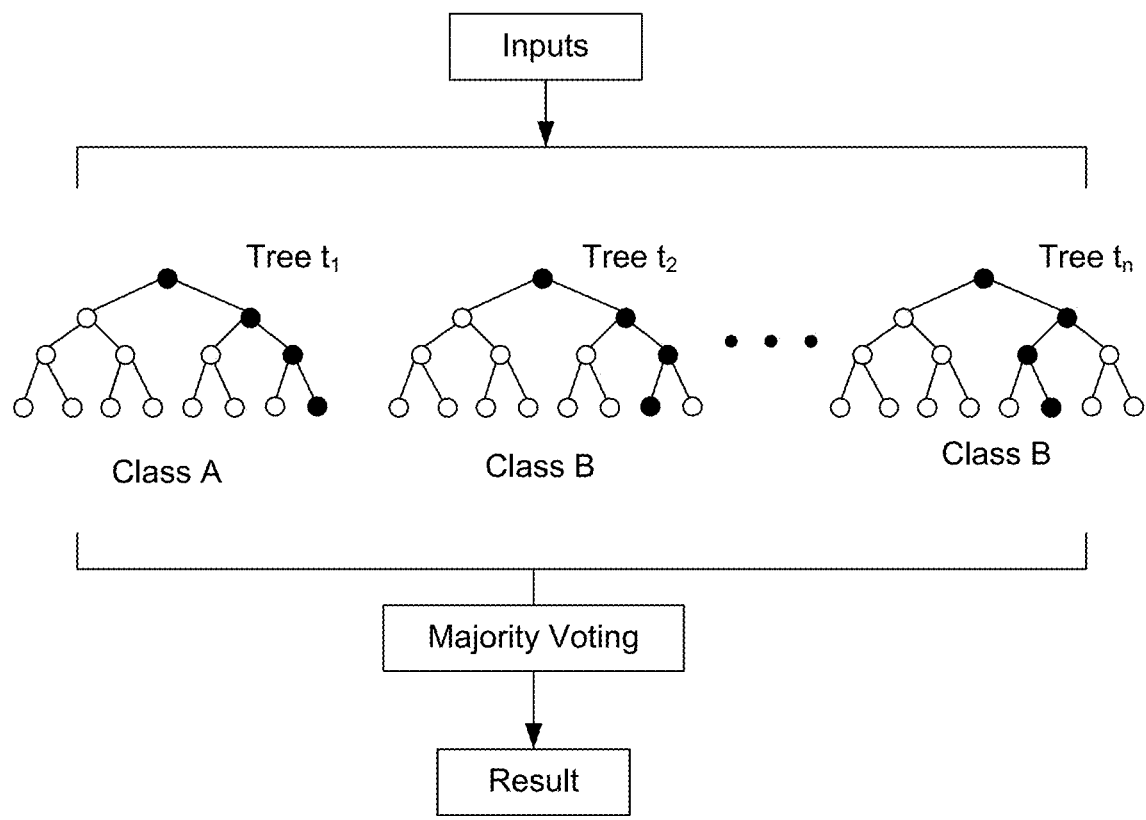
FIG. 12 illustrates an example of a random forest model.

FIG. 12 shows an example of a random forest approach 1200 (e.g., or RANDOM FORESTS™ approach) that includes trees labeled ti to tn. As shown, inputs can be fed to the trees where each of the trees "votes" for a class in a classification scheme where examples of Class A and Class B are shown; noting that other classes can be included. As shown, the votes of the trees can be counted to arrive at a result.

As mentioned, a classification tree approach may be utilized to generate a result for given inputs. As an example, a random forest approach may be utilized to grow many classification trees. As an example, a method can include classifying a new object from an input vector by putting the input vector down each of the trees in a forest. In such an example, each tree can provide a classification where a tree can "vote" for a class. In a forest, the forest chooses the classification having the most votes (e.g., given the votes of the trees in the forest).

As an example, a tree can be grown using a number of cases in a training set, N, by sampling N cases randomly, with replacement from the original data. The sample can be a training set for growing a tree. If there are M input variables, a number m<<M can be specified such that at each node, m variables are selected at random out of the M and the best split on these m is used to split the node. The value of m can be held constant during the forest growing. As an example, each tree can be grown to a largest extent possible (e.g., without pruning).

Forest error rate can depend on various factors such as, for example, the correlation between two trees in the forest where increasing the correlation increases the forest error rate; and strength of each individual tree in the forest where a tree with a low error rate can be a strong classifier and where increasing the strength of the individual trees decreases the forest error rate.

As an example, reducing m can reduce both the correlation and the strength; whereas, increasing m can increase both. For random forests, somewhere in between is an optimal range of m. Using an out-of-bag (oob) error rate, a value of m in the range can be found, which may be an adjustable parameter to which random forests can be somewhat sensitive.

Features of a random forest can include efficiency on large sets of data, estimates of variables are particularly notable for classification, generation of an internal unbiased estimate of the generalization error as the forest building progresses, effective handling of missing data via estimating missing data (e.g., including maintaining accuracy when a relatively large proportion of data may be missing), an ability to balance error in class population unbalanced data sets, ability to use on other data, understanding of relation between the variables and the classification, computation of proximities between pairs of cases (e.g., for use in clustering, locating outliers, etc.), ability to use scaling to provide various views of data, ability to extended to unlabeled data (e.g., leading to unsupervised clustering, data views and outlier detection), and providing an experimental method for detecting variable interactions.

A random forest approach does not over-fit and the number of trees can be many while still maintaining reasonably low computational demands. For example, consider running on a data set with 50,000 cases and 100 variables, which can generate 100 trees in approximately 10 minutes on an 800 MHz processor. As to storage, a random forest approach can include three integer arrays with the same dimensions as the data. Where proximities are to be calculated, storage requirements grow as the number of cases times the number of trees.

A random forest approach can depend on two data objects generated by a random forest. As an example, when a training set for a current tree is drawn by sampling with replacement, about one-third of the cases tend to be left out of the sample. This oob (out-of-bag) data can be used to get a running unbiased estimate of the classification error as trees are added to the forest. It can also be used to get estimates of variable characteristics.

After each tree is built, data can be run down a tree, and proximities computed for each pair of cases. If two cases occupy the same terminal node, their proximity can be increased by one. At the end of a run, the proximities can be normalized by dividing by the number of trees. Proximities can be used in replacing missing data, locating outliers, and/or producing illuminating low-dimensional views of the data.

As to an out-of-bag (oob) error estimate, in a random forest, an unbiased estimate of the test set error can be estimated internally, during a run. For example, consider each tree being constructed using a different bootstrap sample from the original data. In such an approach, about one-third of the cases are left out of the bootstrap sample and not used in the construction of the kth tree. Next, a method can include putting each case left out in the construction of the kth tree down the kth tree to get a classification. In this way, a test set classification can be obtained for each case in about one-third of the trees. At the end of a run, a method can include taking j to be the class that got most of the votes each time case n was oob. In such an approach, the proportion of times that j is not equal to the true class of n averaged over the cases can provide an oob error estimate, which tends to be unbiased. A method can include, for each tree grown in the forest, recording the oob cases and counting the number of votes cast for the proper class. In such an example, the method can randomly permute the values of variable m in the oob cases and put these cases down the tree and then include subtracting the number of votes for the proper class in the variable-m-permuted oob data from the number of votes for the proper class in the untouched oob data. In such an approach, the average of this number over trees in the forest can be a raw importance score for variable m (e.g., a characteristic of the variable m). If the values of this score from tree to tree are independent, then the standard error can be computed by a standard computation. The correlations of these scores between trees can be computed for a number of data sets and proven to be quite low. Thus, a method can compute standard errors in a classical manner and divide the raw score by its standard error to get a z-score, and assign a significance level to the z-score (e.g., assuming normality).

As an example, where the number of variables is relatively large, forests can be run once with a large set of variables, then run again using fewer variables as may be characterized from the first run. As an example, for each case, a method may consider the trees for which it is oob and then subtract the percentage of votes for the proper class in the variable-m-permuted oob data from the percentage of votes for the proper class in the untouched oob data, which can provide a local importance score for variable m for the case.

As an example, each variable $x_m$ can be associated with a probability p(m), which sum to unity. In such an example, the conditional probability of each class, given x is linear in x and depends equally on the strong variables. If the sample size is large, then for strong variables, the Gini criterion can be minimized by a split at the center of the node. The splits by weak variables tend to be random.

As an example, trees can be constructed as follows: i) at each node, a single variable is selected with the mth variable having probability p(m) of being selected; ii) if the variable is strong, the split is at the midpoint of the of values if the selected variable at the node; and iii) if the variable is weak, the split is at a random point along its values in the node.

As an example, a machine learning method can utilize a nearest neighbor algorithm. As an example, a random forest can be a type of nearest neighbor algorithm, for example, it can be an adaptive nearest neighbor algorithm where i) randomization works to reduce the variance; ii) it adapts to the loss function by having the narrowest widths in the terminal nodes corresponding to the largest components of the loss function; iii) it automatically adapts to the sample size; and iv) the optimal value of mtry does not depend on the sample size (see, e.g., Breiman, Consistency for a Simple Model of Random Forests, Technical Report 670, Statistics Department, University of California at Berkeley (2004), which is incorporated by reference herein).

As an example, gradient boosting may be utilized. For example, gradient boosting can be utilized as a machine learning technique for regression and classification problems to generate a prediction model in the form of an ensemble of weak prediction models, which may be in the form of decision trees. Gradient boosting can builds a model in a stage-wise fashion and generalize by allowing optimization of an arbitrary differentiable loss function.

As an example, a machine learning model may be generated using supervised learning where there is an output variable y and a vector of input variables x that describe via a joint probability distribution P(x,y). Using a training set of known values of x and corresponding values of y, a goal can be to find an approximation to a function that minimizes the expected value of some specified loss function. A gradient boosting approach can assume a real-valued y and seek an approximation of the function in the form of a weighted sum of functions from some class, called base (or weak) learners. In accordance with the empirical risk minimization principle, such an approach tries to find an approximation to the function that minimizes the average value of the loss function on the training set (e.g., minimizes the empirical risk). For example, consider starting with a model that includes a constant function and incrementally expands it in a greedy fashion. Such an approach can involve choosing a function at each step for an arbitrary loss function, which can be a computationally infeasible optimization problem in general. Thus, an approach can be restricted for simplification. For example, consider applying a steepest descent step to such a minimization problem (e.g., functional gradient descent). For a continuous case (e.g., a set of arbitrary differentiable functions), a model can be updated where derivatives are taken with respect to the functions with a step length. In a discrete case, when the set is finite, a candidate function can be chosen to be closest to the gradient of the loss function where a coefficient may then be calculated with the aid of line search. Such an approach is heuristic and gives an approximation.

As an example, consider the following pseudocode:

Input: training set (xi,yi) for i=1 to n and a differentiable loss function L(y,F(x)) for a number of iterations M;

Algorithm: initialize a model with a constant value; for m=1 to M, compute pseudo-residuals $r_{im}$ for i=1 to n; fit a base learner (e.g., or weak learner such as a tree) $h_m(x)$ to the pseudo-residuals, which trains it using the training set of xi, $r_{im}$; compute a multiplier ε by solving a one-dimensional optimization problem (e.g., arg min for i=1 to n of the loss function L(yi, $F_{m-1}$(xi)+ε$h_m$(xi)); update the model $F_m$ (e.g., $F_m(x)=F_{m-1}(x)+\varepsilon_m h_m(x)$); and Output: Output the model $F_m(x)$.

In gradient tree boosting, consider an example where, at the m-th step, there is a fitting of a decision tree (e.g., $h_m(x)$) to pseudo-residuals. In such an example, a number of leaves may be specified (e.g., $J_m$) where a tree partitions an input space into $J_m$ disjoint regions and predicts a constant value in each region. In such an approach, coefficients can be multiplied by some value (e.g., $\varepsilon_m$) using a line search to minimize the loss function and then update the model. In such an approach, there can be a separate optimal value (e.g., $\varepsilon_{jm}$) for each region of a tree (e.g., modified TreeBoost).

Figure 13:
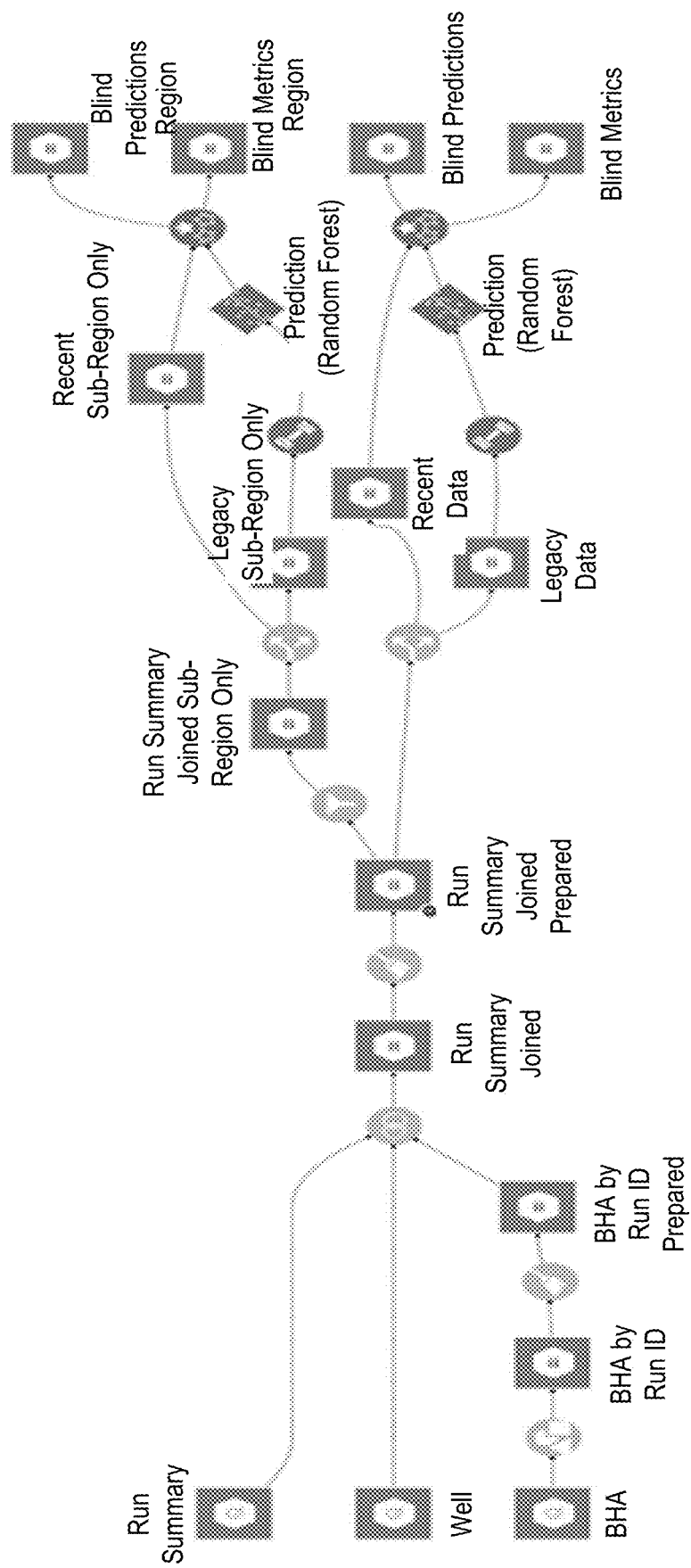
FIG. 13 illustrates an example of a method.

FIG. 13 shows an example of a method 1300 that includes utilizing predictions from one or more random forests. As shown, inputs can be processed to generate outputs. The method 1300 shows a machine learning model flow-path as in the DATAIKU framework (Dataiku, New York, New York). The DATAIKU framework includes features for supervised machine learning, including, for example, Ordinary Least Squares, Ridge Regression, Lasso Regression, Random Forest, Gradient Boosted Tree, Decision Tree, Logistic regression, Support Vector Machine, Stochastic Gradient Descent, and Custom Models.

As an example, an approach may utilize one or more features of the DATAIKU Data Science Studio (DSS). As an example, an AZURE framework may be utilized (e.g., AZURE machine learning studio, etc.). As an example, an approach may utilize the PYTHON language and TENSORFLOW framework.

The DATAIKU DSS supports various technologies, including random forest technologies. In DSS, a random forest can include parameters such as number of trees where DSS can automatically train trees until performance is maximized, or the user can specify a number of trees; maximum depth of tree where maximum depth of each tree in the forest can be selected where higher values tend to increase quality of prediction but may lead to overfitting, noting that high values can also increase the training and prediction time; and minimum samples per leaf, which can be for a single tree node to split the node where lower values tend to increase quality of prediction (by splitting the tree mode) but may lead to overfitting and increased training and prediction time.

As explained, a random forest can be a collection of decision trees where each decision tree is trained using a random sample of a dataset and where a prediction can be made from an entire forest, for example, by averaging the prediction of the trees.

A random forest can have various parameters that can affect performance, including, for example, number of trees where a framework may automatically train trees until performance is maximized (e.g., or a user can specify a number of trees); maximum depth of tree where a maximum depth of each tree in the forest can impact quality of the prediction, but may lead to overfitting; and minimum samples per leaf where a minimum number of samples demanded in a single tree node is specified to split the node (e.g., a lower values can increase the quality of the prediction (by splitting the tree mode), but can lead to overfitting and increased training and prediction time).

As to gradient boosted trees, these can be part of an ensemble method based on decision trees. In such an approach, trees may be added to a model sequentially where each tree attempts to improve the performance of the ensemble as a whole. Parameters can include number of boosting stages where gradient boosting tends to be fairly robust to over-fitting so a large number can result in better performance; learning rate where learning rate shrinks the contribution of each tree and where there is a trade-off between learning rate and number of boosting stages (e.g., smaller learning rates can demand a greater number of boosting stages); loss (deviance or exponential) (e.g., deviance is logistic regression for classification with probabilistic outputs and loss exponential where gradient boosting recovers the AdaBoost algorithm; and maximum depth of tree where the maximum depth of the trees in the ensemble can be specified to limit the number of nodes in the tree and where such a parameter can be tuned for performance (e.g., where an optimal value depends on the interaction of the input variables). As an example, the Dataiku DSS may be utilized for generation and/or use of gradient boosted decision tree.

FIG. 14 shows an example table 1400 of inputs, along with type, units, min/max as to range, input response for model, suggested input units, user input and input resolution. Such a table can also include information for categories such as for the RunType, BitManufacturer, and BHAType_grouped inputs. For example, consider: RunType as being one of Vertical, Lateral, Curve, Tangent, Curve/Lateral, Vertical/Curve, Vertical/Curve/Lateral; BitManufactuer as being one of Smith-SLB, Hughes Christensen (Baker),Security DBS (HAL),ReedHycalog (NOV), Ulterra, Varel, Other; and BHAType_grouped as being one of Rotary Steerable, Steerable Motor, Vortex, and Straight Motor.

As explained, in a random forest approach, variables can be characterized, which may characterize each variable as to "importance". For example, a group of variables can be analyzed to determine what variables are to be included for a particular type of proposed well assessment. In such an example, variables may be particular to a particular region, a particular type of well, etc. In turn, a model may be specialized to be adapted for a particular region, a particular type of well, etc. As mentioned, inputs may be analyzed to appropriately select a particular ML model.

As an example, inputs may be analyzed in a manner that adapts inputs of a graphical user interface. For example, consider a graphical user interface that includes a first set of input fields that can be analyzed to determine what a subsequent set of input fields are to include (e.g., for rendering to a display, etc.). In such an approach, location may be in a first set of input fields where the location can be analyzed to determine what are appropriate inputs for subsequent GUIs or for revision of the initial GUI.

As an example, an initial input field may be for a variable that has a particular character across various models. For example, consider location as being a relatively high ranked variable as to "importance" in a decision tree-based model.

FIG. 15 shows an example of a variables analysis 1500 where various examples of variables are ranked according to corresponding "importance". As shown, well longitude and well latitude are ranked number five and number six, respectively. Further, the analysis 1500 indicates that planned drilling distance and OBROP are the two top ranked variables as to "importance". As an example, a GUI may be organized using an analysis such as the analysis 1500 where, for example, an initial set of inputs includes input fields for higher ranked variables.

In some instances, some of the variables may not be amenable to change for a proposed well. For example, if a leasehold is for a particular location, that location may be fixed and not subject to change.

Referring again to the table 1400 of FIG. 14, as can be seen in the analysis 1500 of FIG. 15, the table 1400 includes top ranking variables. Such an approach can help make a method more robust as to determining a chance of success of meeting a run objective.

As explained, a method can provide for real-time success prediction and optimization of a proposed job (e.g., a drilling job, etc.).

As explained, an initial release result may be informative and cause a user to go back and change one or more of their input parameters in order to change the output. As an example, a method can include highlighting one or more input parameters which may have decreased a percentage output; thus highlighting to the user which parameters they may want to alter.

As explained, a model can be a trained model, which may be trained, for example, using supervised learning. For example, consider a method where a model is trained using a supervised method with binary output (e.g., run objective met representing success and failure); noting that one or more other outputs can be used to train the model (e.g., additionally and/or alternatively). As an example, an unsupervised method may be used for training the model.

As an example, a machine learning model can be built on data from previous wells. Once trained, the model can be used in an application to predict the performance of a job with inputs that have been selected for that job and, for example, to optimize the success rate by modifying the input parameters.

As an example, a model can be or include a boosted decision tree algorithm. As an example, one or more other types of algorithms may be utilized (e.g., XGboost, random forest, etc.).

As an example, a method can include generating a machine learning model by preprocessing data (e.g., standardize the formatting, removing outliers, linking data tables), splitting the data into a train set and a test set (e.g., to address overfitting), selecting relevant features, training the model using appropriate algorithm and parameters, using the test set of the data to evaluate model performance, modifying parameters of the model training and reassess, outputting a generated trained model once satisfactory model performance has been achieved.

As an example, a ML model can be accessible via an application programming interface (API), which may receive calls from a remote device and respond to a call by returning a result. For example, consider a call from a mobile device to a computational framework that includes a trained machine model where the call includes values for at least some inputs and where, in response, the computational framework transmits information to the remote device, which may be, for example, a result. As to other types of responses, consider indications of what input fields to render to a user interface, an acknowledgement of a type of trained model being available for use, an indication as to an update to an entry as to a range violation, an indication as to an entry that is to be filled, etc. As explained, a model can be executed in response to an API call where the model can generate a result such that the result can be transmitted as part of a response to the API call where the result can be, for example, a predicted chance of success for a job.

As an example, an app can be part of a system where the app can indicate to a user which inputs to change in order to increase a success output, where the app can cause display of how each factor (e.g., variable) has contributed to a calculation of a result, where the app can allow a user to alter the geographical range for a model to work in (e.g., some planned wells may be very basin specific where training/testing data are readily available), where the app may allow other planned wells (e.g., in unknown territories) to utilize a wider range of inputs (e.g., to matching for one or more appropriate trained models, etc.), where the app allows for saving inputs/output(s) in different scenarios, where the app allows for email or otherwise send scenarios and outputs, etc.

As explained, a computational framework or frameworks may include multiple models. For example, consider a model for each geologically similar geography. As an example, separate models can exist for the Permian Basin and the Appalachian Basin, which may help to improve accuracy of results.

As an example, rather than including specifics on a formation to be drilled through, a model can use location information such as, for example, latitude and/or longitude. In such an approach, total vertical depth of a well can be included, which may also provide for similar formations to be clustered.

While various examples pertain to assessing risk (e.g., chance of success) of drilling a new well in a known environment, an approach can be utilized to assess risk of drilling a well in an unknown environment, for example, by extrapolating (e.g., interpolating, etc.) based on similar characteristics.

As explained, machine learning can be utilized to replace reliance on a highly experienced engineer when planning sales contracts. Without a trained ML model, a sales engineer would use his/her knowledge and experience to bid for a contract in addition (in some cases) to a long process of examining offset well data and making a judgement on the similarity to the proposed well. Also, if a sales engineer (e.g., from personal experience) determines that there is an additional risk involved, the sales engineer is likely to call upon a drilling engineer to examine offset well data, where time may be available to do so. As an example, a ML model-based approach can replace such a lengthy process by making clusters of similar wells and identifying which the planned well is most similar to and interpolates the chance of success of this well based on these. As an addition, an app can include confidence limits around one or more input parameters that can indicate how close current inputs are to the past data that have been used in the training model.

As an example, a ML model can be a "deep learning" ML model. Deep learning (e.g., deep structured learning or hierarchical learning) is part of a broader family of machine learning methods that can utilize artificial neural networks (ANNs). As an example, learning can be supervised, semi-supervised or unsupervised. A deep learning (DL) architecture (e.g., deep neural networks, deep belief networks, recurrent neural networks, convolutional neural networks, etc.) may be utilized for generating a ML model or ML models suitable for use in drill out operations.

As an example, the TENSORFLOW framework (Google LLC, Mountain View, California) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

Figure 16:
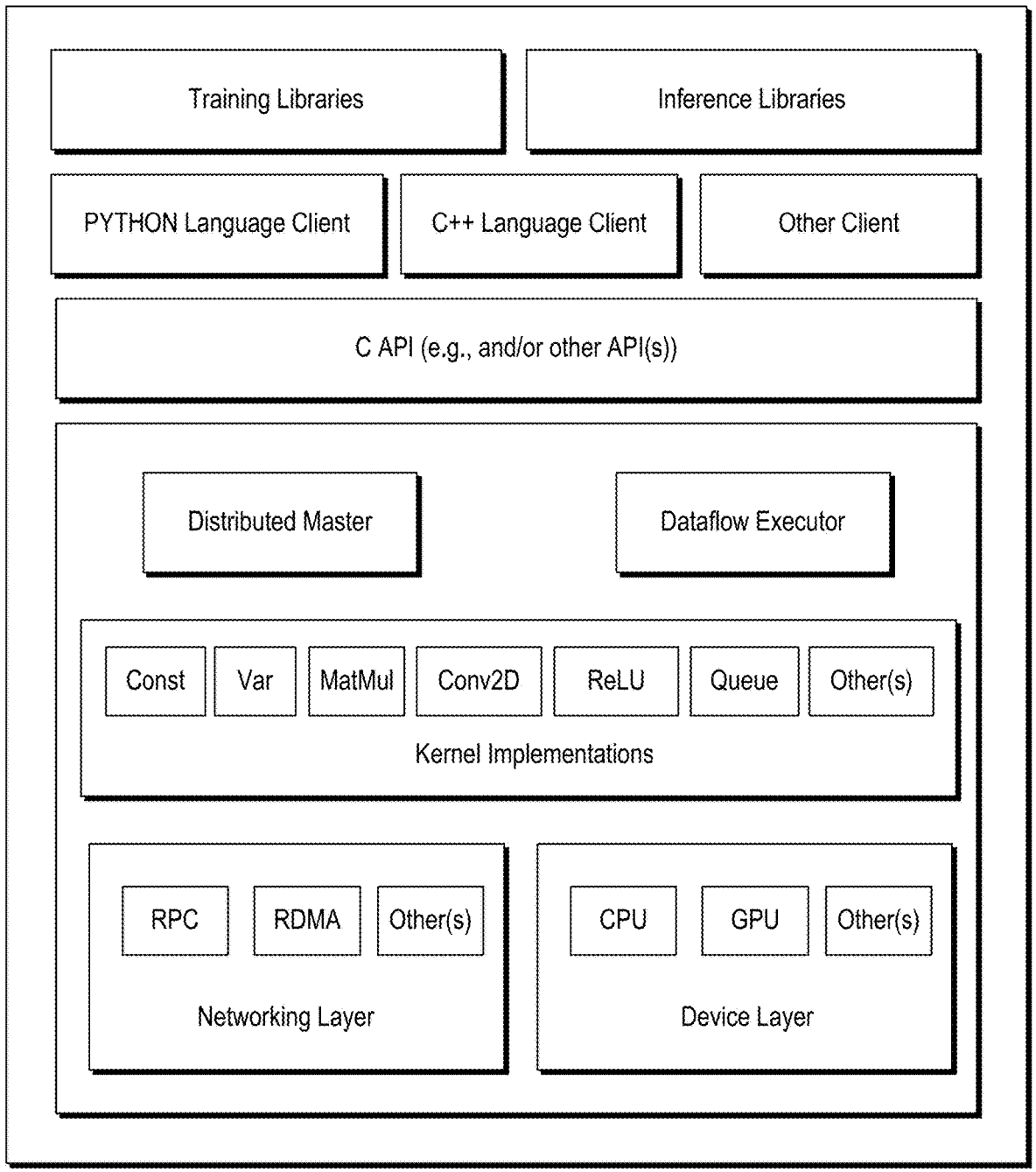
FIG. 16 illustrates an example of a framework.

FIG. 16 shows an architecture 1600 of a framework such as the TENSORFLOW framework. As shown, the architecture 1600 includes various features. As an example, in the terminology of the architecture 1600, a client can define a computation as a dataflow graph and, for example, can initiate graph execution using a session. As an example, a distributed master can prune a specific subgraph from the graph, as defined by the arguments to "Session.run( )"; partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

As an example, a method can include receiving inputs that specify characteristics of a proposed well; generating an indicator for construction of the proposed well using the inputs and a machine learning model trained using data from actual wells (e.g., where the indicator is chance of success of an objective being met as discussed above); and transmitting the indicator. In such an example, receiving can receive the inputs as part of an application programming interface call and transmitting can automatically transmit the indicator as a response to the call.

As an example, inputs can include location data where a method can include selecting a machine learning model from a group of machine learning models using the location data. For example, consider a selected machine learning model that is trained using data from actual wells in a region that corresponds to the location data.

As an example, a method can include analyzing received inputs and, based on the analyzing, selecting the machine learning model from a group of machine learning models, and transmitting an instruction that specifies one or more input fields for the selected machine learning model to be rendered to a graphical user interface. In such an example, the method can include receiving one or more inputs that correspond to the one or more input fields.

As an example, inputs can include one or more of a planned drilling distance input, a rate of penetration input, a dogleg severity input, and a depth input. As an example, at least one input can be range restricted (e.g., numerically, etc.). For example, consider at least one input that is range restricted based on a location of a proposed well.

As an example, a method can include geolocating the origin of inputs and, in response, selecting a machine learning model using the geolocated origin.

As an example, a method can include receiving a revised input and, in response, generating a revised indicator.

As an example, a method can include training a machine learning model. For example, consider using a decision tree model to generate a trained decision tree model. As an example, training can include gradient boosting. As an example, a machine learning model can be or include a gradient boosted decision tree model.

As an example, a system can include a processor; memory accessible to the processor; processor-executable instructions stored in the memory and executable by the processor to instruct the system to: receive inputs that specify characteristics of a proposed well; generate an indicator for construction of the proposed well using the inputs and a machine learning model trained using data from actual wells; and transmit the indicator.

As an example, one or more computer-readable media can include computer-executable instructions executable to instruct a computing system to: receive inputs that specify characteristics of a proposed well; generate an indicator for construction of the proposed well using the inputs and a machine learning model trained using data from actual wells; and transmit the indicator.

Figure 17:
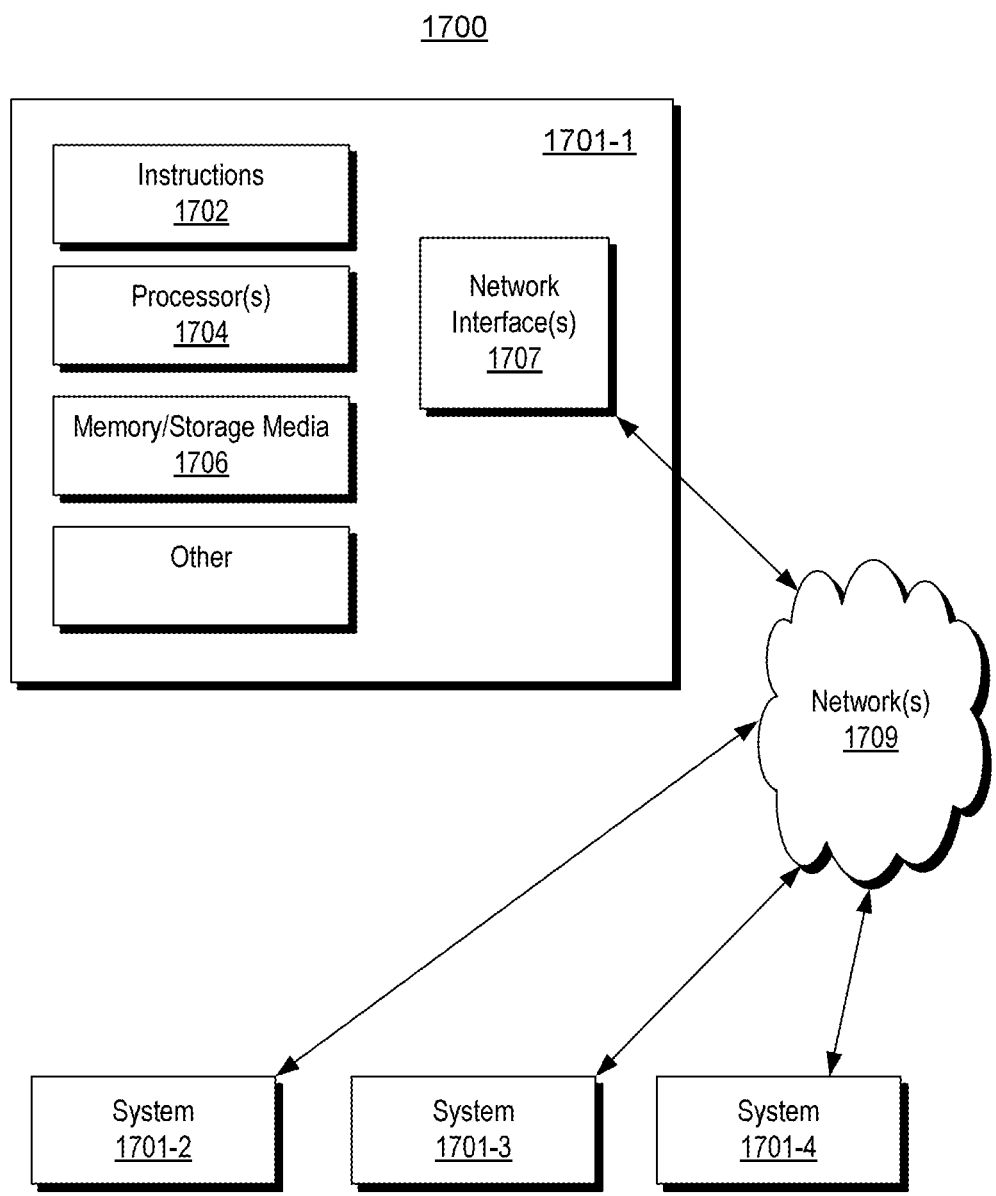
FIG. 17 illustrates examples of computing and networking equipment.

In some embodiments, a method or methods may be executed by a computing system. FIG. 17 shows an example of a system 1700 that can include one or more computing systems 1701-1, 1701-2, 1701-3 and 1701-4, which may be operatively coupled via one or more networks 1709, which may include wired and/or wireless networks.

As an example, a system can include an individual computer system or an arrangement of distributed computer systems. In the example of FIG. 17, the computer system 1701-1 can include one or more sets of instructions 1702, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 1704, which is (or are) operatively coupled to one or more computer or processor-readable media 1706 (e.g., via wire, wirelessly, etc.). As an example, one or more of the one or more processors 1704 can be operatively coupled to at least one of one or more network interface 1707. In such an example, the computer system 1701-1 can transmit and/or receive information, for example, via the one or more networks 1709 (e.g., consider one or more of the Internet, a private network, a cellular network, a satellite network, etc.).

As an example, the computer system 1701-1 may receive from and/or transmit information to one or more other devices, which may be or include, for example, one or more of the computer systems 1701-2, etc. A device may be located in a physical location that differs from that of the computer system 1701-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the media 1706 may be implemented as one or more computer-readable or machine-readable storage media, as one or more computer-readable or machine-readable transmission media, or a combination thereof. As an example, storage media, transmission media, or a combination thereof may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

Transmission media refers to non-physical media which carries instructions in the form of computer-readable instructions or code. Examples can include carrier waves and wireless signals. Thus, by way of example, implementations of the present disclosure can include at least two distinct kinds of computer, machine, or processor-readable media, namely storage media and transmission media. Combinations of storage media and transmission media are also within the scope of computer-readable media.

As an example, a storage medium or media may be located in a machine running machine-readable instructions, or located at a remote site from which machine-readable instructions may be downloaded over a network for execution. The network may include or operate as a transmission medium or media.

In some examples, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 18:
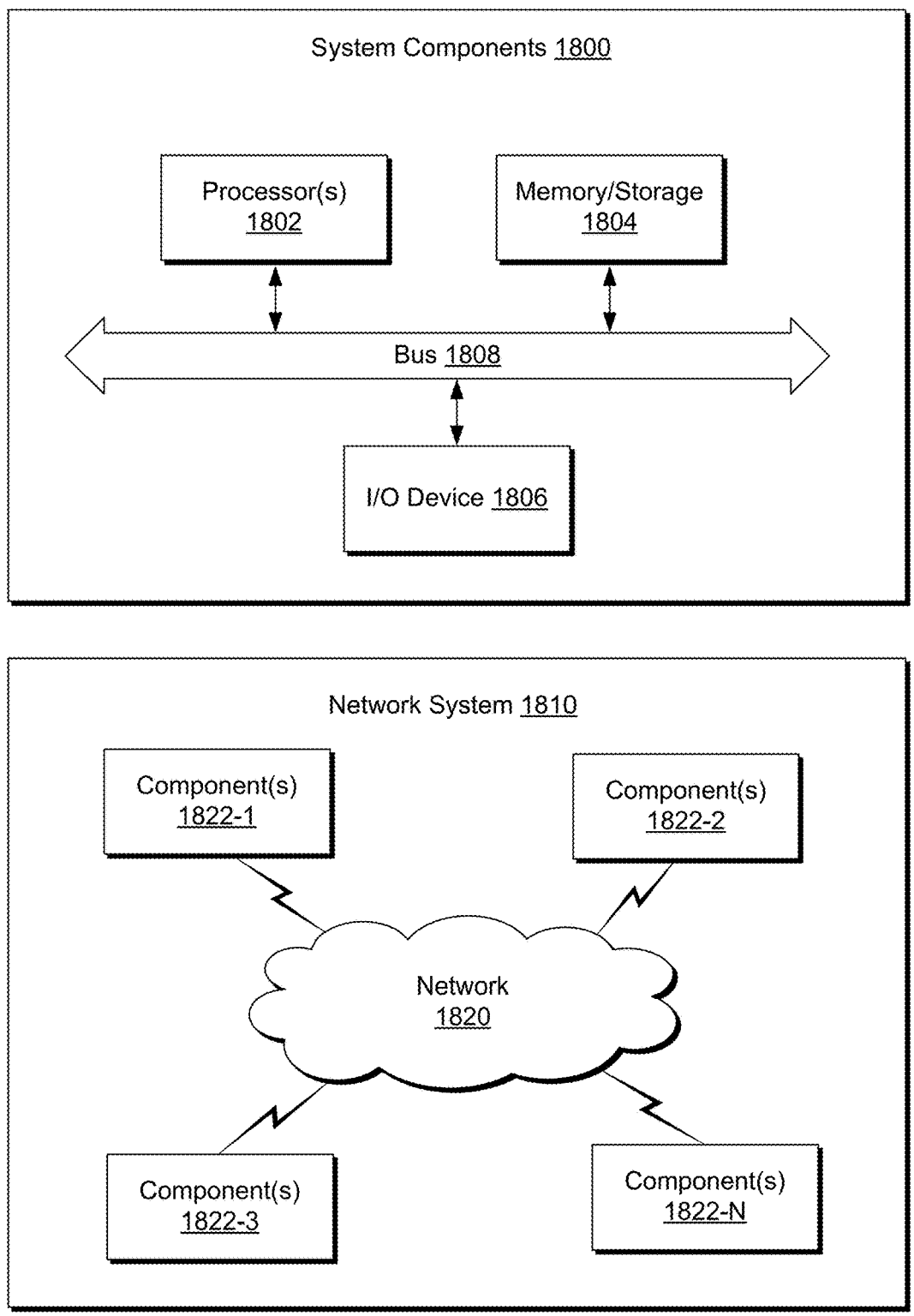
FIG. 18 illustrates example components of a system and a networked system.

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, . . . 1822-N. For example, the components 1822-1 may include the processor(s) 1802 while the component(s) 1822-3 may include memory accessible by the processor(s) 1802. Further, the component(s) 1822-2 may include an I/O device for display and optionally interaction with a method. The network 1820 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically.

Although only a few examples have been described in detail above, those skilled in the art will readily appreciate that many modifications are possible in the examples.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function for any limitations of any of the claims herein, except for those in which the claim expressly uses the words "means for" together with an associated function.

What is claimed is:

1. A method comprising:
receiving first inputs, from a user via a user interface of a computing device or from a user device via a network interface of the computing device, wherein the first inputs specify at least a geographic location of a proposed well;
displaying input fields on the user device or on a graphical user interface (GUI) of the user interface, wherein the input fields are associated with a machine learning model, of a group of machine learning models associated with a plurality of geographic locations, and wherein the machine learning model is associated with the specified geographic location of the proposed well;
receiving second inputs to the input fields, from the user via the user interface or via the network interface of the computing device, wherein the second inputs specify characteristics of the proposed well, wherein the second inputs include at least a rate of penetration input, a depth input, and a planned drilling distance input, and wherein the second inputs are received as part of an application programming interface call;
transmitting, by the computing device to the user device or to the GUI of the user interface, an indicator with feedback for construction of the proposed well using the second inputs and a machine learning model trained using data from actual wells, wherein the indicator indicates a percentage chance that the construction of the proposed well, based on the specified characteristics of the proposed well, will meet at least one run objective for the proposed well, wherein the indicator further indicates at least one of the second inputs that is identified as causing a reduction of the percentage chance, and wherein transmitting the indicator occurs automatically as a response to the application programming interface call;
receiving revised inputs, in response to the indicator, from the user via the user interface or from the user device via the network interface of the computing device, wherein the revised inputs specify at least one adjusted characteristic of the proposed well, and wherein the revised inputs include the at least one of the second inputs identified as causing the reduction of the percentage chance; and
constructing the proposed well in accordance with the adjusted characteristics.

2. The method of claim 1, wherein the actual wells comprise wells in the geographic location.

3. The method of claim 1, wherein the second inputs further include a dogleg severity input.

4. The method of claim 1, wherein at least one of the second inputs is range restricted.

5. The method of claim 4, wherein the at least one of the second inputs is range restricted based on the geographic location of the proposed well.

6. The method of claim 1, further comprising generating a revised indicator based on the revised inputs.

7. The method of claim 1, wherein the machine learning model is trained using at least one of a decision tree model, gradient boosting, or a gradient boosted decision tree model.

8. The method of claim 1, wherein the indicator includes contributions of a plurality of the second inputs to a calculation of an overall percentage chance of success for the construction of the proposed well.

9. A system comprising:
a processor;
storage media accessible to the processor;
a user interface or a network interface; and
processor-executable instructions stored in the storage media and executable by the processor to instruct the system to:
receive first inputs, from a user via the user interface or from a user device via the network interface, wherein the first inputs specify at least a geographic location of a proposed well;
display input fields on the user device or a graphical user interface (GUI) of the user interface, wherein the input fields are associated with a machine learning model, of a group of machine learning models associated with a plurality of geographic locations, and wherein the machine learning model is associated with the specified geographic location of the proposed well;
receive second inputs to the input fields, from the user via the user interface or via the network interface, wherein the second inputs specify characteristics of the proposed well, wherein the second inputs include at least a rate of penetration input, a depth input, and a planned drilling distance input, and wherein the second inputs are received as part of an application programming interface call;
transmit, to the user device or to the GUI of the user interface, an indicator for construction of the proposed well using the second inputs and a machine learning model trained using data from actual wells, wherein the indicator indicates a percentage chance that the construction of the proposed well, based on the specified characteristics of the proposed well, will meet at least one run objective for the proposed well, wherein the indicator further indicates at least one of the second inputs that is identified as causing a reduction of the percentage chance, and wherein transmitting the indicator occurs automatically as a response to the application programming interface call;
and
receive revised inputs, in response to the indicator, from the user via the user interface or the network interface, wherein the revised inputs specify at least one adjusted characteristic of the proposed well, and wherein the revised inputs include the at least one of the second inputs identified as causing the reduction of the percentage chance.

10. The system of claim 9, wherein the actual wells comprise wells in the geographic location.

11. The system of claim 9, wherein the second inputs further include a dogleg severity input.

12. At least one non-transitory computer-readable storage medium having stored thereon computer-executable instructions that, when executed, instruct a computing system to:

receive first inputs, from a user via a user interface of the computing system or from a user device via a network interface of the computing system, wherein the first inputs specify at least a geographic location of a proposed well;

display input fields on the user device or a graphical user interface (GUI) of the computing system, wherein the input fields are associated with a machine learning model, of a group of machine learning models associated with a plurality of geographic locations, and wherein the machine learning model is associated with the specified geographic location of the proposed well;

receive second inputs to the input fields, from the user via the user interface or via the network interface of the computing system, wherein the second inputs specify characteristics of the proposed well, wherein the second inputs include at least a rate of penetration input, a depth input, and a planned drilling distance input, and wherein the second inputs are received as part of an application programming interface call;

transmit, by the computing system to the user device or to the GUI of the user interface, an indicator with feedback for construction of the proposed well using the second inputs and a machine learning model trained using data from actual wells, wherein the indicator indicates a percentage chance that the construction of the proposed well, based on the specified characteristics of the proposed well, will meet at least one run objective for the proposed well, wherein the indicator further indicates at least one of the second inputs that is identified as causing a reduction of the percentage chance, and wherein transmitting the indicator occurs automatically as a response to the application programming interface call;

and receive revised inputs, in response to the indicator, from the user via the user interface or from the user device via the network interface of the computing system, wherein the revised inputs specify at least one adjusted characteristic of the proposed well, and wherein the revised inputs include the at least one of the second inputs identified as causing the reduction of the percentage chance.

13. The at least one non-transitory computer-readable storage medium of claim 12, wherein the actual wells comprise wells in the geographic location.

14. The at least one non-transitory computer-readable storage medium of claim 12, wherein the second inputs further include a dogleg severity input.

* * * * *